(12) United States Patent
Ghalib

(10) Patent No.: US 8,021,543 B2
(45) Date of Patent: Sep. 20, 2011

(54) WASTEWATER TREATMENT SYSTEM

(76) Inventor: Saad A. Ghalib, Ann Arbor, MI (US)

( * ) Notice: Subject to any disclaimer, the term of this patent is extended or adjusted under 35 U.S.C. 154(b) by 791 days.

(21) Appl. No.: 11/916,150

(22) PCT Filed: Jun. 2, 2006

(86) PCT No.: PCT/US2006/021540
§ 371 (c)(1),
(2), (4) Date: Nov. 30, 2007

(87) PCT Pub. No.: WO2006/130850
PCT Pub. Date: Dec. 7, 2006

(65) Prior Publication Data
US 2010/0187188 A1    Jul. 29, 2010

Related U.S. Application Data

(60) Provisional application No. 60/686,595, filed on Jun. 2, 2005.

(51) Int. Cl.
*C02F 1/50* (2006.01)
(52) U.S. Cl. ... 210/155; 210/159; 210/162; 210/170.03; 210/203; 210/206; 210/257.1; 405/53
(58) Field of Classification Search .............. 210/170.03
See application file for complete search history.

(56) References Cited

U.S. PATENT DOCUMENTS

| | | |
|---|---|---|
| 1,793,599 A | 2/1931 | Egan |
| 3,592,342 A | 7/1971 | Shankle |
| 4,457,646 A | 7/1984 | Laesch |
| 4,865,069 A | 9/1989 | Lacey |
| 4,892,440 A | 1/1990 | Regan |
| 5,161,911 A | 11/1992 | Regan |
| 5,344,562 A | 9/1994 | Lorenz et al. |
| 5,433,845 A | 7/1995 | Greene et al. |
| 5,505,840 A | 4/1996 | Caldwell |
| 5,514,278 A | 5/1996 | Khudenko |
| 5,752,785 A | 5/1998 | Tanaka et al. |
| 5,902,477 A | 5/1999 | Vena |
| 6,000,880 A | 12/1999 | Halus |
| 6,062,767 A * | 5/2000 | Kizhnerman et al. .......... 405/39 |

(Continued)

OTHER PUBLICATIONS

Franklin L. Burton, "Wastewater Engineering Treatment, Disposal, and Reuse", Metcalf & Eddy, Inc., revised by George Tchobanoglous, pp. 539-552 (McGraw-Hill, Inc., 3d Edition).

(Continued)

*Primary Examiner* — Peter A Hruskoci
(74) *Attorney, Agent, or Firm* — Brooks Kushman P.C.

(57) ABSTRACT

A wastewater treatment system for treating excess wastewater from a sewer system includes a container having first and second portions adapted to receive excess wastewater from the sewer system, and a generally horizontally oriented screen arrangement disposed in the second portion of the container. The system further includes a treating agent dispenser for introducing a treating agent into the wastewater, and an effluent passage in fluid communication with the second portion of the container. During a sufficient rain event, the wastewater flows from the sewer system into the container, through the screen arrangement, and then into the effluent passage, such that the wastewater flows generally in a first direction through the first portion of the container, then generally in a second direction different than the first direction through the second portion of the container. The treating agent dispenser is operative to introduce the treating agent to thereby sufficiently disinfect at least a portion of the wastewater.

18 Claims, 18 Drawing Sheets

U.S. PATENT DOCUMENTS

| | | |
|---|---|---|
| 6,077,448 A * | 6/2000 | Tran-Quoc-Nam et al. .. 210/790 |
| 6,102,618 A | 8/2000 | Takada et al. |
| 6,126,361 A | 10/2000 | Gardiner |
| 6,132,626 A | 10/2000 | Hart |
| 6,214,228 B1 | 4/2001 | Jones et al. |
| 6,318,395 B1 | 11/2001 | Anderson et al. |
| 6,371,690 B1 | 4/2002 | Monteith |
| 6,503,404 B2 | 1/2003 | Ghalib |
| 6,638,424 B2 | 10/2003 | Stever et al. |
| 6,663,769 B2 | 12/2003 | Hosoya |
| 6,726,846 B2 | 4/2004 | Johnstone |
| 6,783,683 B2 | 8/2004 | Collings |
| 6,796,325 B1 | 9/2004 | Courier |
| 7,022,243 B2 | 4/2006 | Bryant |
| 7,025,076 B2 | 4/2006 | Zimmerman et al. |
| 7,025,887 B1 | 4/2006 | Kirts et al. |
| 7,094,337 B2 * | 8/2006 | Williams et al. ............... 210/162 |
| 7,163,635 B2 | 1/2007 | Fitzgerald |
| 7,182,874 B2 * | 2/2007 | Allard et al. ................... 210/788 |
| 7,314,549 B2 * | 1/2008 | Swift ....................... 210/170.03 |
| 7,485,221 B2 * | 2/2009 | Ghalib ..................... 210/170.03 |
| 7,540,953 B2 * | 6/2009 | Fitzgerald ..................... 210/162 |

OTHER PUBLICATIONS

"Design of Municipal Wastewater Treatment Plants", WEF Manual of Practice No. 8, 4th Edition, ASCE Manuals and Reports on Engineering Practice No. 76, pp. 11-35 through 11-40 (Water Environment Federation, Alexandria, VA and American Society of Civil Engineers, Reston, Va. 1998).

International Search Report and Written Opinion mailed Oct. 16, 2006, 6 pages.

\* cited by examiner

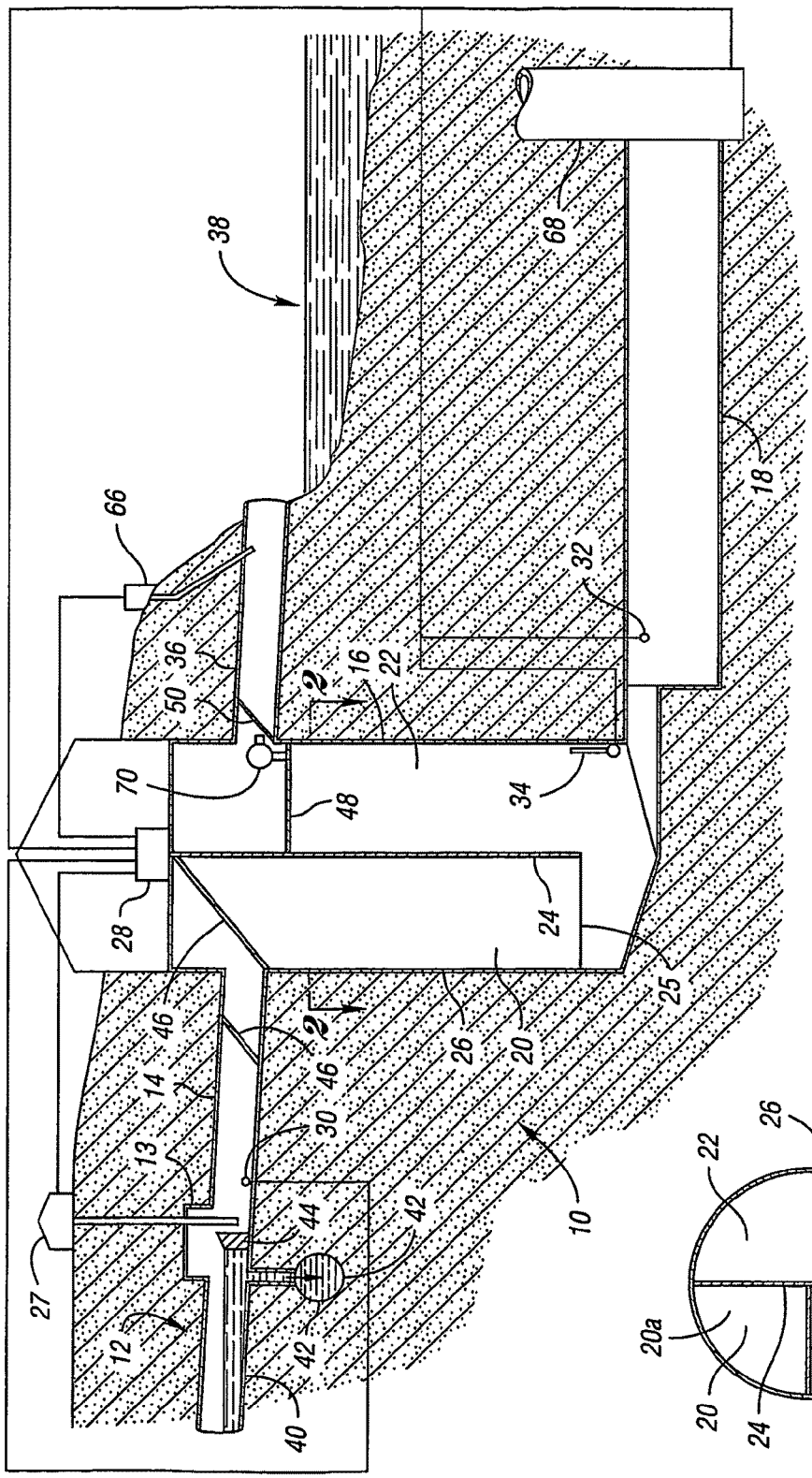
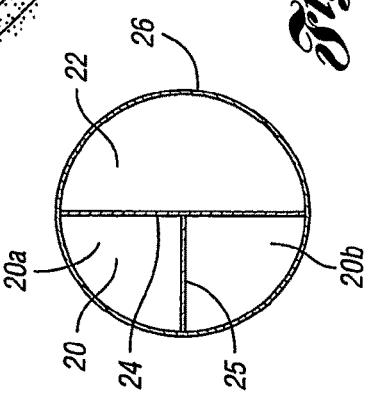

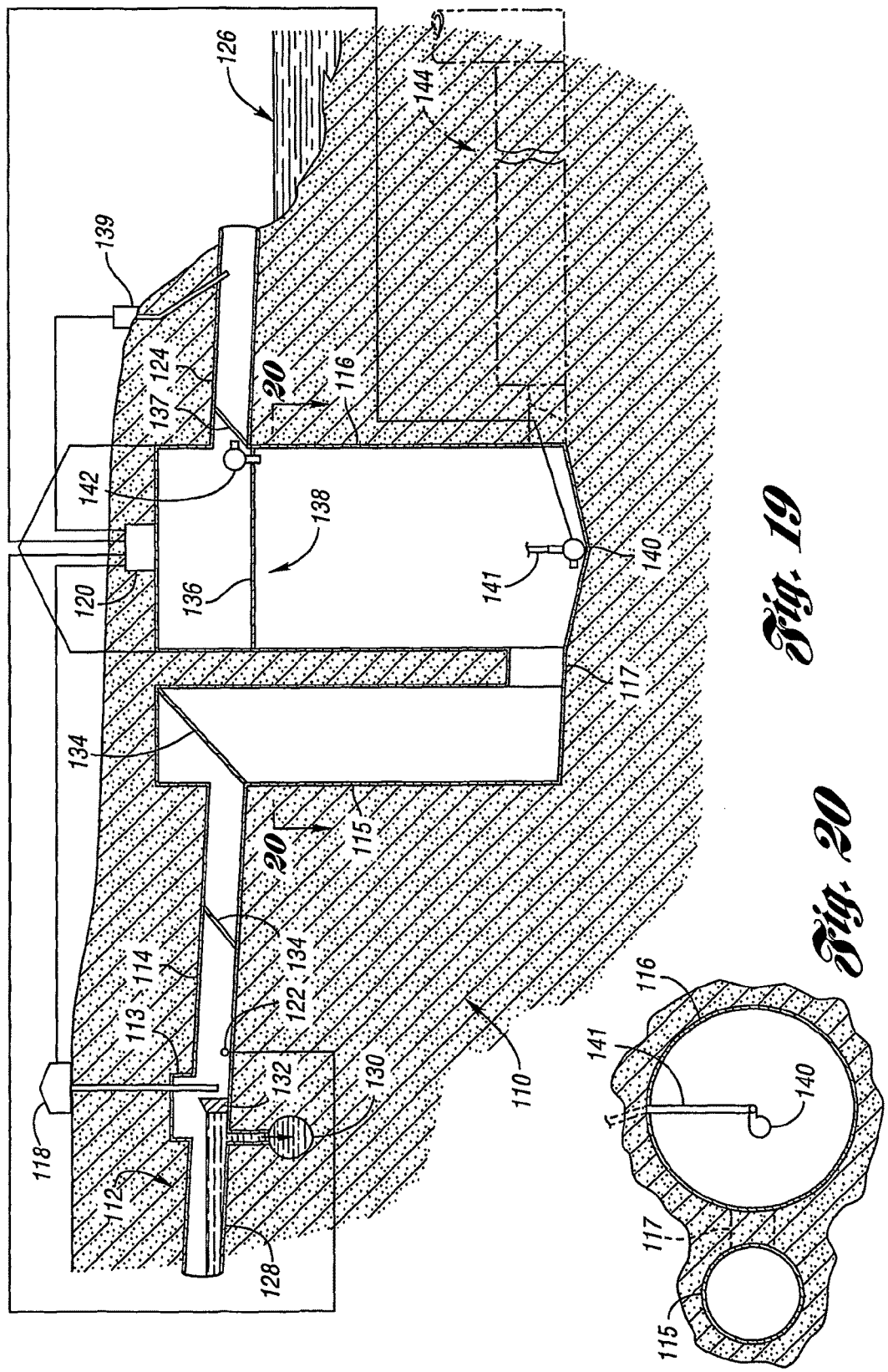

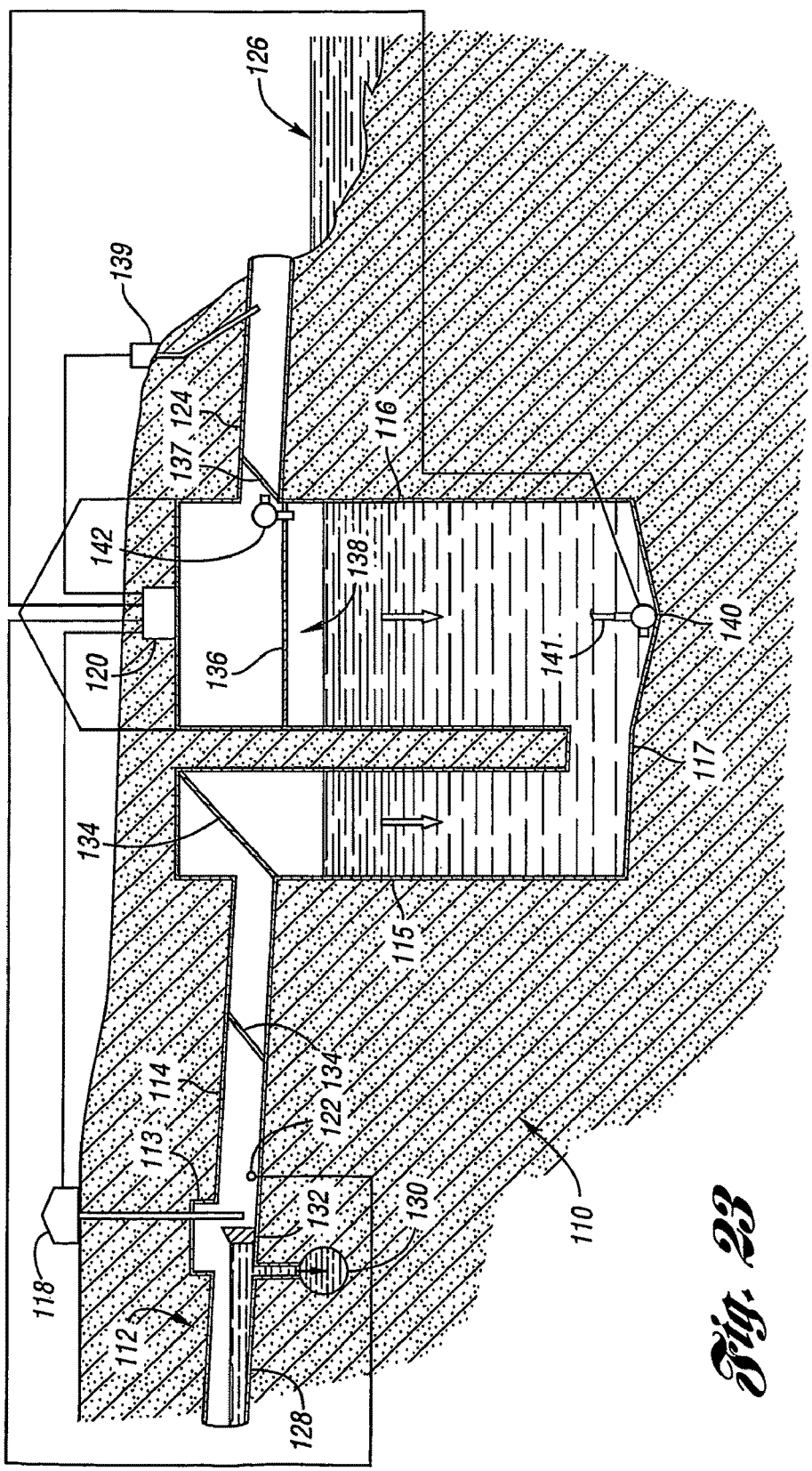

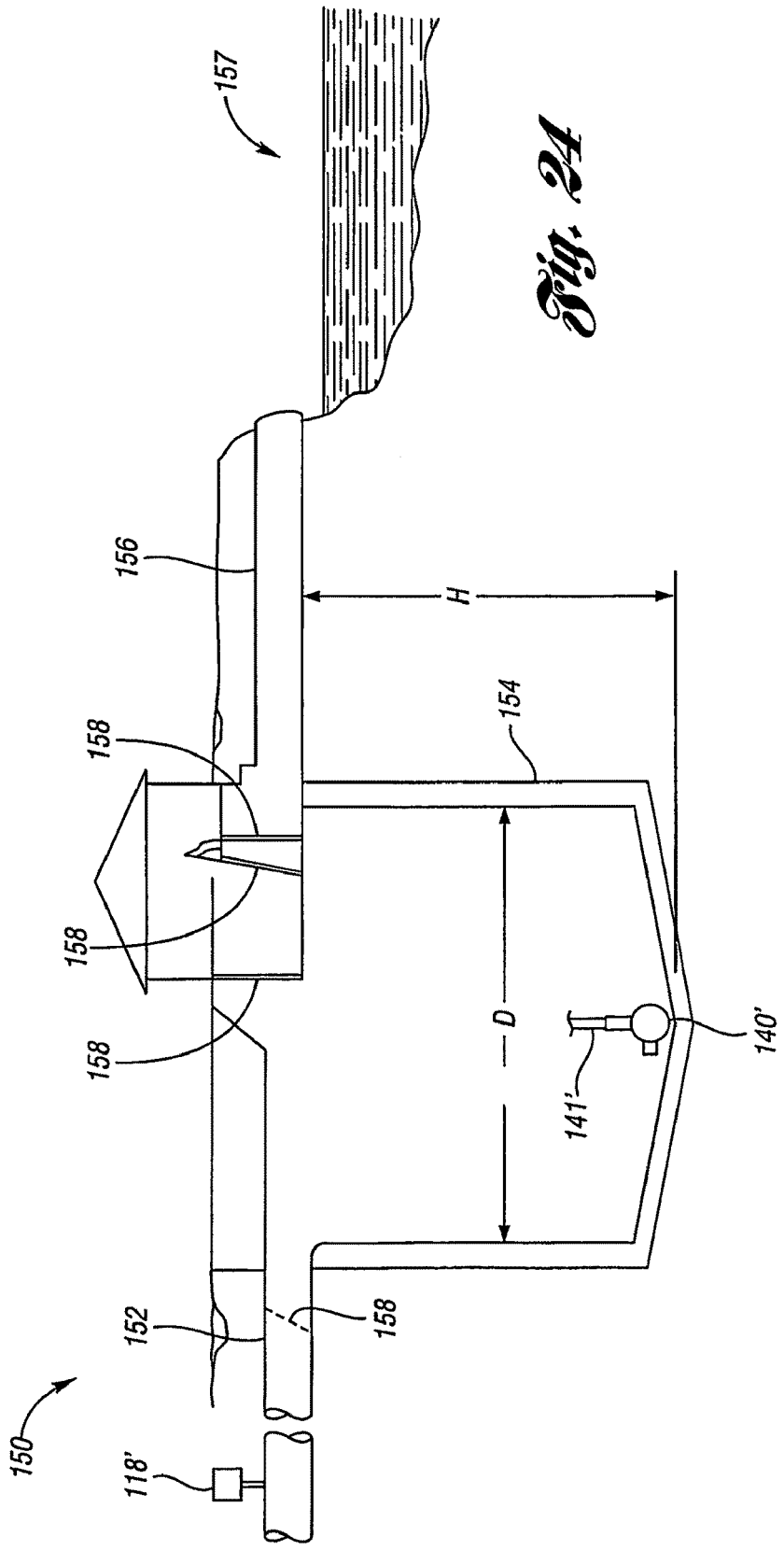

WASTEWATER TREATMENT SYSTEM

CROSS-REFERENCE TO RELATED APPLICATIONS

This application claims the benefit of U.S. application Ser. No. 60/686,595 filed on Jun. 2, 2005, which is hereby incorporated by reference in its entirety.

BACKGROUND OF THE INVENTION

1. Field of the Invention

The invention relates to systems and methods for treating excess wastewater from a sewer system, such as a combined sewer system or a sanitary sewer system.

2. Background Art

A combined sewer system is a sewer system that is designed to carry both sanitary sewage and storm water runoff. Such sanitary sewage and/or storm water runoff may be referred to as wastewater. During normal conditions, such as dry weather conditions, wastewater is transported by the combined sewer system to a wastewater treatment facility, where the wastewater is treated prior to being discharged. During a rain event, however, flow of wastewater may exceed treatment capacity of the treatment facility. In such a case, overflow wastewater may be diverted to one or more storage basins or tunnels until the treatment facility is able to treat the excess wastewater.

SUMMARY OF THE INVENTION

According to one aspect of the invention, a wastewater treatment system for treating excess wastewater from a sewer system is provided. The system includes a treating agent dispenser for introducing a treating agent into the wastewater, and a container adapted to receive excess wastewater from the sewer system. The container has first and second portions that each have an upper end and a lower end, the lower ends being interconnected. The system further includes a generally horizontally oriented screen arrangement disposed in the second portion of the container, and an effluent discharge passage in fluid communication with the second portion of the container. During a sufficient rain event, the wastewater flows from the sewer system into the upper end of the container first portion, through the container first and second portions and the screen arrangement, and then into the effluent discharge passage, such that the wastewater flows generally in a first direction through the first portion of the container, then generally in a second direction different than the first direction through the second portion of the container. The system is configured so that the treating agent has sufficient contact time with the wastewater to at least partially disinfect the wastewater during the rain event.

Other aspects of the invention, including systems and methods, are disclosed in the following detailed description. While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a schematic view of a treatment system according to the invention in fluid communication with a sewer system, wherein the treatment system includes a shaft structure having first and second portions, and a tunnel in fluid communication with the shaft structure;

FIG. 2 is a horizontal cross-sectional view of the shaft structure represented in the schematic view of FIG. 1, taken along a line similar to line 2-2 shown in FIG. 1;

FIG. 19 is a schematic view of a second embodiment of a treatment system in fluid communication with a sewer system, wherein the treatment system includes first and second shaft structures connected together by a connector passage;

FIG. 20 is a horizontal cross-sectional view of the first and second shaft structures represented in the schematic view of FIG. 19, taken along a line similar to line 20-20 shown in FIG. 19;

FIG. 23 is a schematic view of the treatment system after the rain event has subsided, and showing the shaft structures being dewatered; and FIG. 24 is a schematic view of a wastewater storage system including a single shaft structure.

DETAILED DESCRIPTION

Figure 3:
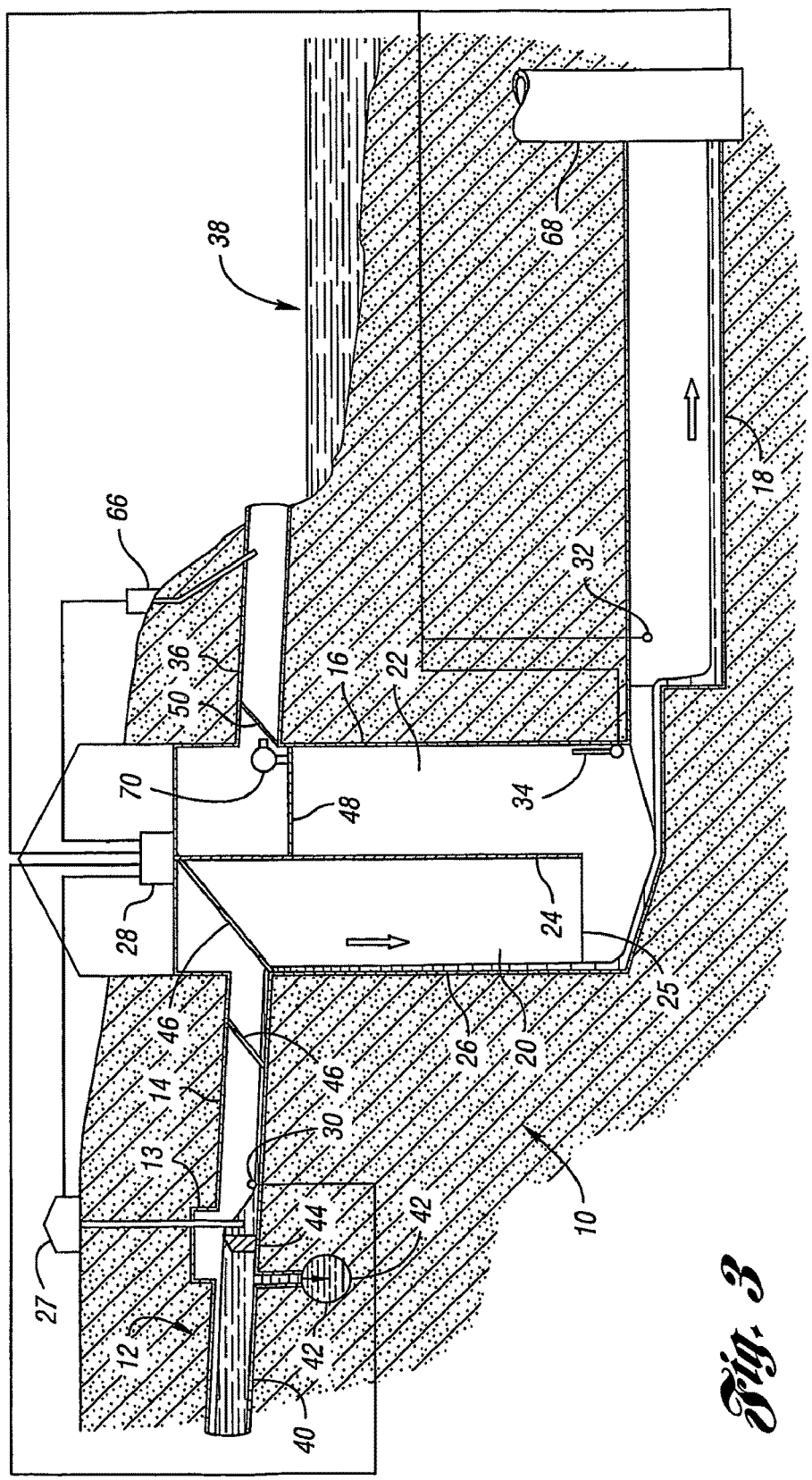
FIG. 3 is a schematic view of the treatment system during a rain event showing excess wastewater flowing from the sewer system through the shaft structure and into the tunnel.

FIG. 1 shows a wastewater treatment system 10 according to the invention for treating excess wastewater from a sewer system 12. Sewer system 12 may be, for example, a combined sewer that is designed to carry both sanitary sewage and storm water runoff, or a sanitary sewer system that experiences increased flows during a rain event. Such a sanitary sewer system may experience increased flows due to storm water infiltration into the sanitary sewer system. The term "wastewater" as used in the application refers to sanitary sewage and/or storm water runoff.

The wastewater treatment system 10 includes a diversion chamber 13 and an influent passage 14 for receiving excess wastewater, such as wastewater overflow, from the sewer system 12. The treatment system 10 further includes a first container such as a shaft structure 16 in fluid communication with the influent passage 14, and a second container such as a tunnel 18 in inhibitable fluid communication with the shaft structure 16.

Referring to FIGS. 1 and 2, the shaft structure 16 includes first and second portions, such as first and second passages 20 and 22, respectively, separated by a divider 24, such as a baffle wall. In one embodiment, the shaft structure 16 is disposed substantially or entirely below ground and is oriented generally vertically. For example, the shaft structure 16 and the passages 20 and 22 may each have a longitudinal axis that is coincident with a vertical line or that extends at an angle with respect to a vertical line.

In the embodiment shown in FIG. 2, the divider 24 has a generally straight configuration and is attached to an exterior wall 26 of the shaft structure 16. Furthermore, the shaft structure 16 may include an additional baffle wall 25 that aids in supporting the divider 24 and that divides the first passage 20 into two sub-passages 20a and 20b. Alternatively, the divider 24 may have any suitable configuration for dividing the interior of shaft structure 16 into two or more portions having the same or different volumes. For example, the divider 24 may be a baffle wall having a generally V-shaped, a generally U-shaped, or a generally circular horizontal cross-section. In addition, divider 24 is configured to allow wastewater to pass from first passage 20 to second passage 22 proximate the bottom of shaft structure 16. For example, divider 24 may terminate above the bottom of shaft structure 16, or may have an opening proximate the bottom of shaft structure 16.

In one embodiment of the invention, the shaft structure 16 has a generally circular horizontal cross-section having a diameter in the range of 10 to 200 feet. Alternatively, the shaft structure 16 may have a cross-section that defines any suitable shape, such as a hexagon, octagon, ellipse, or rectangle, and that has any suitable hydraulic diameter, such as a hydraulic diameter in the range of 5 to 200 feet. In addition, the shaft structure 16 may have any suitable length, such as a generally vertical length in the range of 30 to 200 feet. Furthermore, the shaft structure 16 may be made of concrete, or any other suitable material such as steel. For example, the shaft structure 16 may comprise a plurality of concrete rings that are stacked on top of each other in a sealing relationship.

The tunnel 18 may have any suitable size as needed for a particular application. For example, the tunnel 18 may have a diameter in the range of 4 feet to 30 feet, and a length in the range of 0.5 to 10 miles. Furthermore, the tunnel 18 may comprise concrete or any other suitable material, such as steel.

The treatment system 10 also includes a treating agent dispenser, such as a treating agent injection system 27, for injecting or otherwise introducing a treating agent, such as chlorine or a solution that includes chlorine, into the excess wastewater so as to treat the excess wastewater. For example, the treating agent may be a sodium hypochlorite disinfection solution that is used to disinfect the excess wastewater. The treating agent injection system 27 may also include a mixer (not shown) disposed at or near the point of injection for mixing the treating agent with the excess wastewater. The mixer may include, for example, a bubbler and/or a mechanical mixer.

A computer control system, such as a controller 28, is in communication with the treating agent injection system 27 for controlling introduction of the treating agent. The controller 28 is also in communication with a flow sensor 30 disposed in the influent passage 14, a fluid level sensor 32 disposed in the tunnel 18, and an automatic gate 34 for inhibiting flow to the tunnel 18. While the controller 28 may be disposed in any suitable position, in the embodiment shown in FIG. 1, the controller 28 is disposed proximate the shaft structure 16.

An effluent passage 36 is in fluid communication with the second passage 22 of the shaft structure 16. The effluent passage 36 may be used to discharge treated wastewater from the treatment system 10 to a river 38 or any other suitable area, such as another receiving water body.

Referring to FIGS. 1-7, operation of the treatment system 10 will now be described in detail. Under normal operating conditions, such as during dry weather conditions, wastewater flows through trunk sewer 40 of the sewer system 12 and into an interceptor 42 as shown in FIG. 1. The interceptor 42 carries wastewater to a treatment facility, such as a wastewater treatment plant (not shown). During a sufficient rain event, flow from the trunk sewer 40 will exceed capacity of the interceptor 42, and excess wastewater will flow into influent passage 14. As shown in FIG. 3, for example, excess wastewater may flow over a weir 44 in diversion chamber 13 and into influent passage 14. Advantageously, the treatment system 10 may be configured to handle a relatively large flow rate, such as a flow rate in the range of 2,000 to 1,500,000 gallons per minute.

Figure 4:
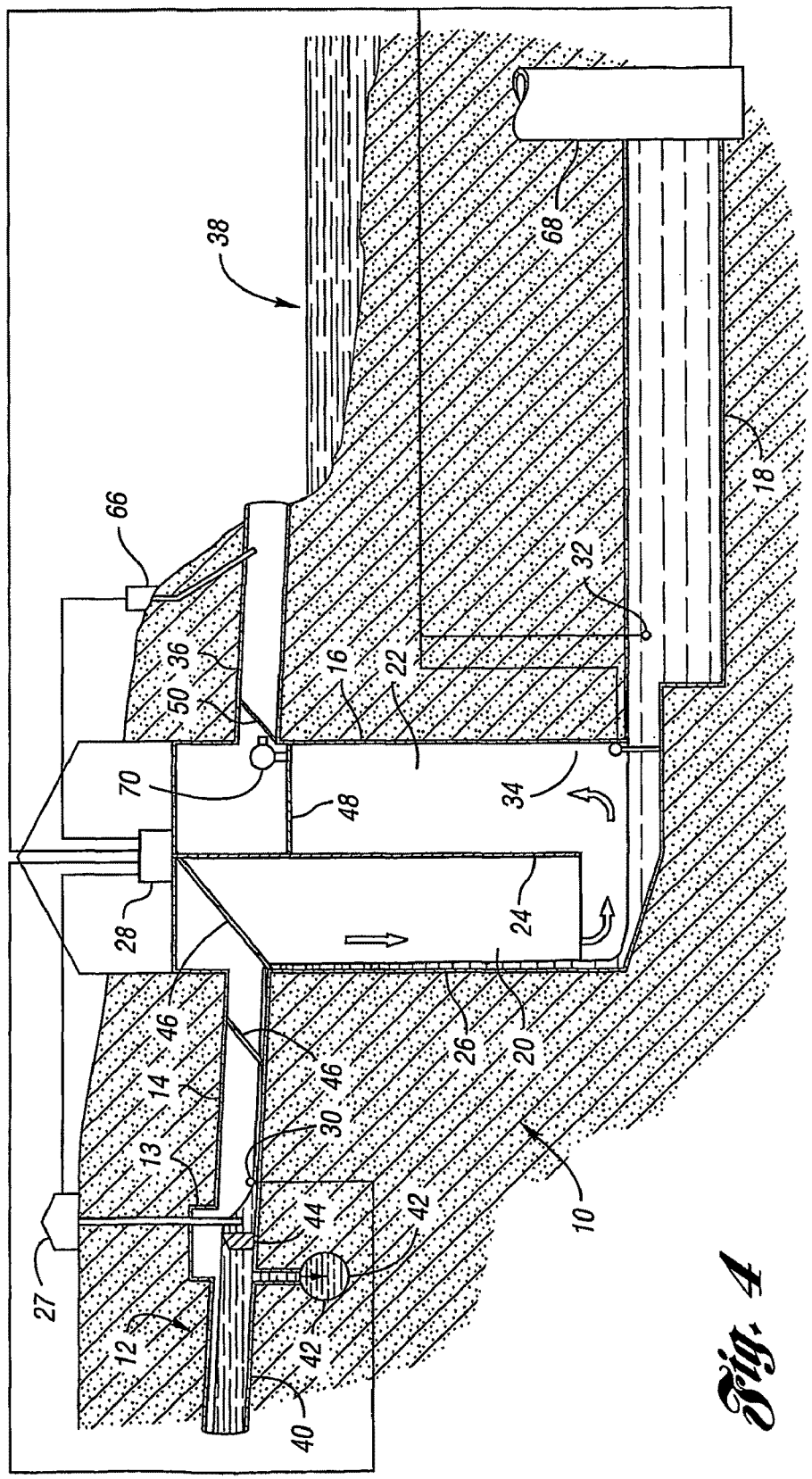
FIG. 4 is a schematic view of the treatment system showing inhibited flow into the tunnel, and excess wastewater flowing from the first portion into the second portion of the shaft structure.

Excess wastewater may then flow through one or more screens 46, such as inclined, vertical and/or horizontal screens, located in the influent passage 14 and/or the shaft structure 16 so as to remove floatable matter and/or suspended solids from the excess wastewater. Next, referring to FIG. 3, a first quantity of the excess wastewater will flow through the first passage 20 and into the tunnel 18 until flow into the tunnel 18 is inhibited. Flow into the tunnel 18 may be inhibited when excess wastewater contained in the tunnel 18 reaches a predetermined level and the gate 34 is automatically closed, as shown in FIG. 4. As another example, flow into the tunnel 18 may be inhibited when the tunnel 18 reaches capacity. When flow into the tunnel 18 is inhibited, wastewater may be pumped from the tunnel 18 to allow a certain amount of flow to continue into the tunnel 18. Otherwise, flow into the tunnel 18 may cease.

Referring to FIG. 4, just before flow into the tunnel 18 is inhibited, the controller 28 may cause the treating agent injection system 27 to initiate injection of the treating agent into the excess wastewater. The treating agent may be injected at any suitable rate, such as a rate sufficient to achieve a treating agent level in the range of 10 to 25 milligrams per liter of excess wastewater. Mixers of the treating agent injection system 27 may also be used to enhance mixing of the treating agent with the excess wastewater. Such mixers may be located, for example, at and/or downstream of the point of treating agent injection.

Alternatively, treating agent injection may begin at any suitable time, such as immediately upon flow exceeding capacity of the interceptor 42, or any time thereafter. Furthermore, treating agent injection may occur at any suitable point, such as upstream of the shaft structure 16 and/or within the shaft structure 16. For example, treating agent injection may occur upstream of the weir 44 to facilitate mixing of the treating agent with the excess wastewater.

Figure 5:
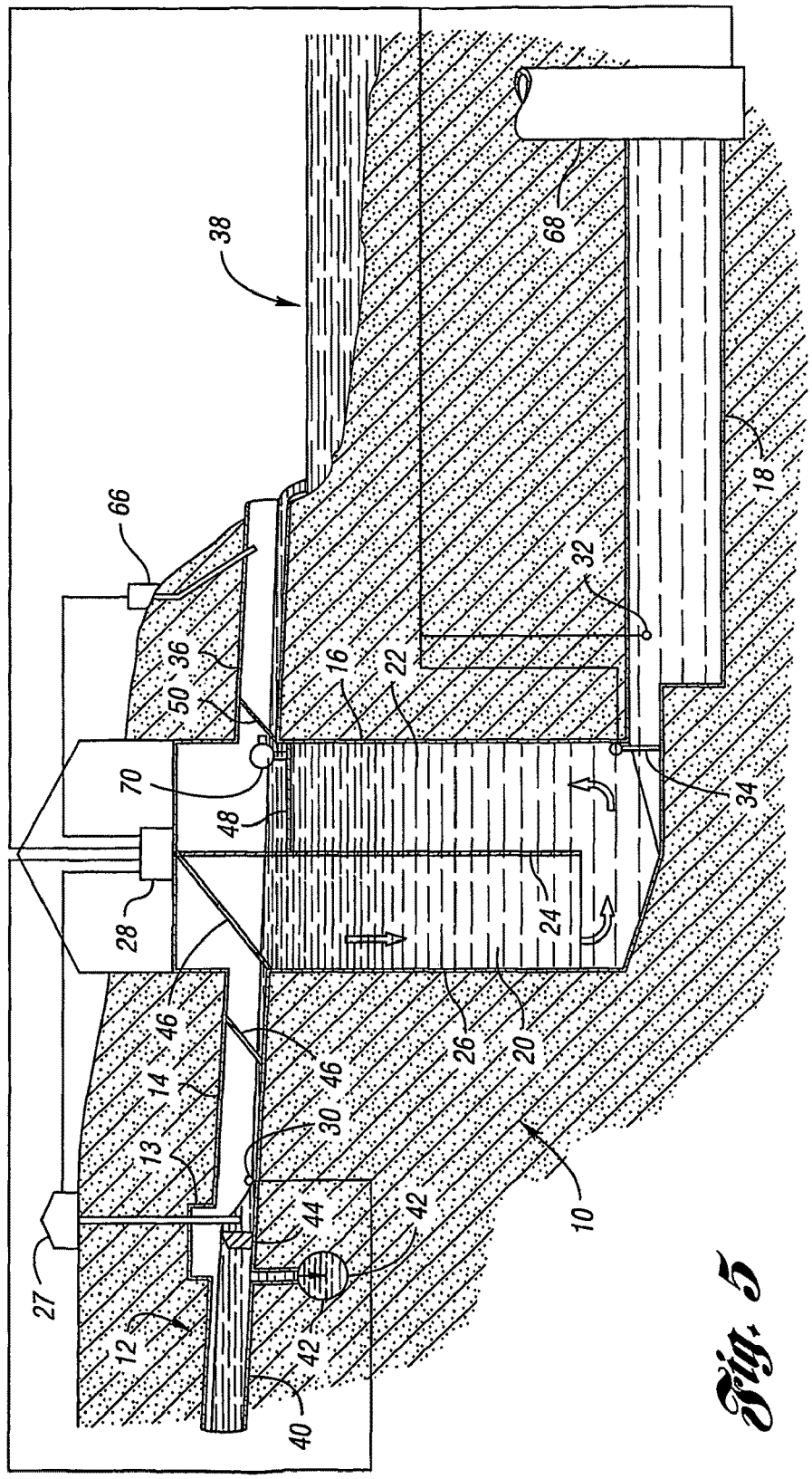
FIG. 5 is a schematic view of the treatment system showing excess wastewater passing from the second portion of the shaft structure to an effluent passage in fluid communication with the shaft structure.

If the rain event continues, excess wastewater will flow through the first passage 20, under the divider 24 and into the second passage 22 until the shaft structure 16 reaches capacity. Eventually, if the rain event continues, treated excess wastewater will flow into the effluent passage 36 and then into the river 38, as shown in FIG. 5.

The treatment system 10 may further include one or more screens 48, such as inclined, vertical and/or horizontal screens, disposed in the second passage 22 of the shaft structure 16, and/or one or more screens 50, such as inclined, vertical and/or horizontal screens, disposed in the effluent passage 36 for removing floatables and/or suspended solids from the treated excess wastewater. Such screens 48 and/or 50 may be provided as an alternative to or in addition to the screens 46 located in the influent passage 14 and/or first passage 20.

In the embodiment shown in FIGS. 8-13, the screens 48 provided in the second passage 22 of the shaft structure 16 are arranged in a generally horizontally oriented screen arrangement 52 that is positioned proximate an upper end of the second passage 22. The screen arrangement 52 may have a modular construction, which may facilitate dismantling and re-assembly of the screen arrangement 52 for maintenance and/or repairs. For example, one or more screens 48 may be connected together to form a screen unit 54, and the screen units 54 may be supported by a support structure having one or more generally horizontal support members, such as baffle walls or beams 56, that extend between screen units 54. In one embodiment, each screen 48, which may be referred to as a screen module, is approximately 4.3 feet long, 4.0 feet wide, and 1.4 feet high, and up to five screens 48 are joined together to form one screen unit 54. Alternatively, each screen 48 may have any suitable size and shape. For example, each screen 48 may have a length in the range of 4 to 25 feet, a width in the range of 3 to 5 feet, and a height in the range of 1 to 3 feet.

Each screen 48 may be constructed of any suitable material, such as 316 stainless steel. Furthermore, the screens 48 may be designed to provide any suitably sized openings, such as openings in the range of 4 millimeters (mm) to 2 inches. In one embodiment, each screen 48 may be configured as a bar screen having 5 mm openings. Suitable screens 48 are available from CDS Technologies of Morgan Hill, Calif.

The beams 56 may also be constructed of any suitable material, such as concrete and/or steel. Furthermore, the beams 56 may be integrally formed with the shaft structure 16.

Figure 13:
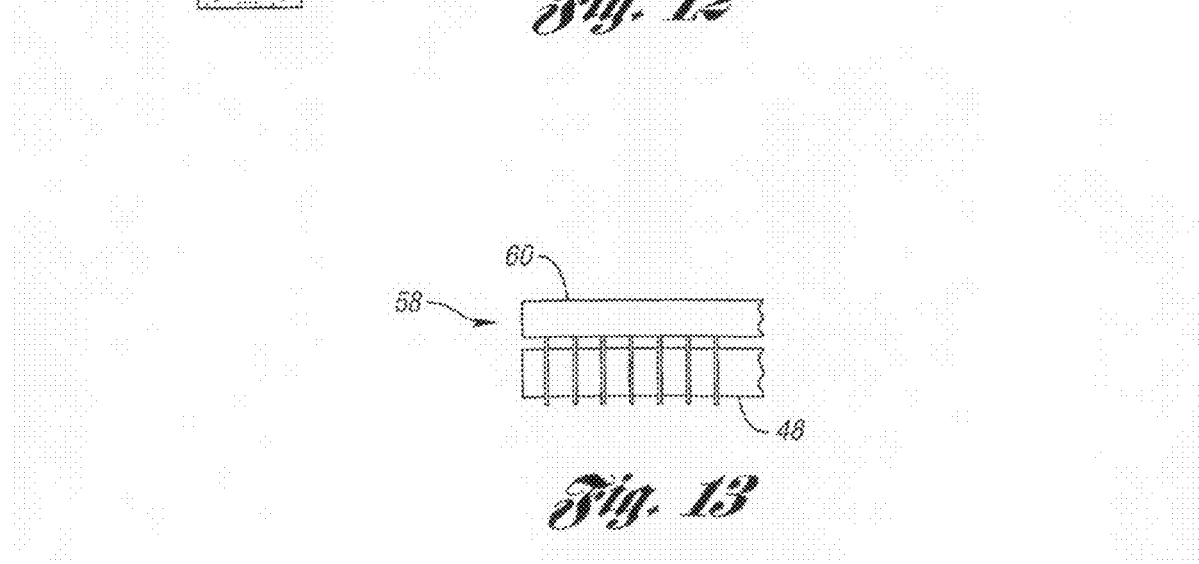
FIG. 13 is a fragmentary cross-sectional view of a screen of the screen arrangement and showing a cleaning member positioned above the screen.
Figure 14:
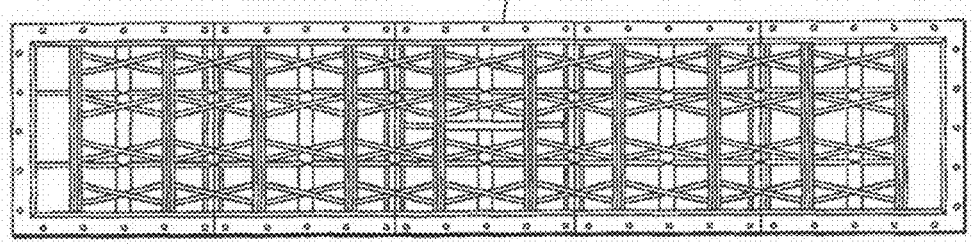
FIG. 14 is a top view of a screen unit of the screen arrangement.

The screen arrangement 52 further includes a cleaning system, such as a rake system 58, for removing material, which may be referred to as screenings, from the screens 48. The rake system 58 may include one or more cleaning members 60, such as combs, brushes and/or scrapers, for each screen 48 or screen unit 54. The cleaning members 60 may be joined together by cross braces and may be driven in any suitable manner, such as with a hydraulic cylinder or ram mounted above the cleaning members 60. As another example, the cleaning members 60 may be rotatable members that are driven hydraulically, or by any suitable means. If the cleaning members 60 are configured as combs, for example, the cleaning members 60 may be positioned above the screen material and pass through the screen material, as shown in FIG. 13. As another example, the cleaning members 60 may be configured as scrapers that are positioned beneath the screen material.

Figure 11:
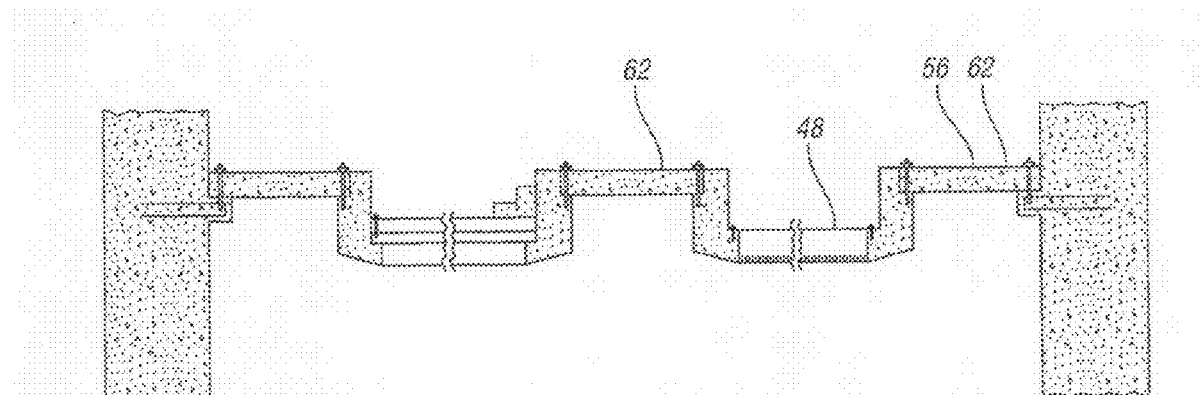
FIG. 11 is a cross-sectional view of the screen arrangement taken along line 11-11 of FIG. 10.
Figure 12:
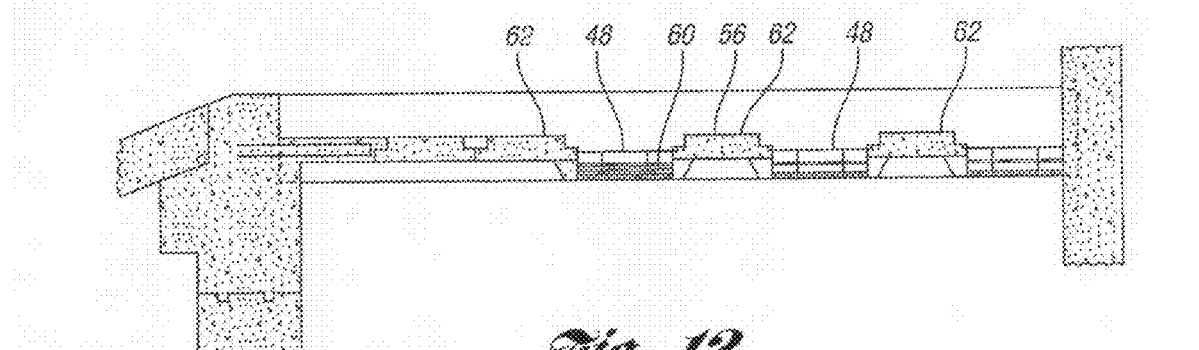
FIG. 12 is a cross-sectional view of the screen arrangement taken along line 12-12 of FIG. 10.

The generally upwardly flow pattern through the second passage 22 of the shaft structure 16 may reduce the loading on the screens 48 compared to usual screen types used in a typical CSO facility. The flow pattern through the second passage 22 may also cause floatables to be trapped behind raised portions 62 of the beams, which portions 62 are raised relative to the screens 48 as shown in FIGS. 11 and 12. Furthermore, screenings removed from the screens 48 by the rake system 58 may also be trapped behind the raised portions 62 of the beams 56. Moreover, heavy debris may settle to the bottom of the passages 20 and 22.

The raised portions 62 of the beams 56 may have any suitable configuration. For example, bottom surfaces of the raised portions 62 may extend approximately 6 to 60 inches above the screens 48. In addition, the raised portions 62 may have any suitable width, such as a width in the range of 2 to 20 feet.

It is anticipated that the loading to a screen 48 configured as a horizontal raked bar screen having 5 mm openings, for example, may be reduced by approximately 70% due to the flow pattern through the shaft structure 16. It is also anticipated that approximately 70% of the influent screening may either 1) float and be retained behind the beams 56, or 2) settle within the shaft structure 16.

The screen arrangement 52 may provide several advantages over inclined or vertical screens, such as vertical raked bar screens. For example, the screen arrangement 52 may provide the following: 1) allow for the maximum overflow capacity with minimal headloss; 2) reduce the need for a large above ground building to house screens; 3) allow for the entire screen field to be utilized in all events, thus reducing the effective screen loading during smaller events; and 4) the upward flow through the screens 48 causes relatively low and uniform hydraulic loading rates resulting in low screen approach velocities and reduced impingement on the screen field. Furthermore, the screenings may be collected within dedicated storage areas located adjacent to the screens 48 and will be dewatered back to the interceptor 42, for example, for treatment at the wastewater treatment plant.

The screen arrangement 52 may be configured to provide any suitable screen velocity (water velocity through open spaces of a screen 48). For example, the screen arrangement 52 may be designed to achieve a screen velocity of no more than 3 ft/sec, which is consistent with existing industry practice (assuming a 25% blinding factor for all screens 48), with a maximum screen headloss of 4-inches or less for peak flow rates.

Figure 8:
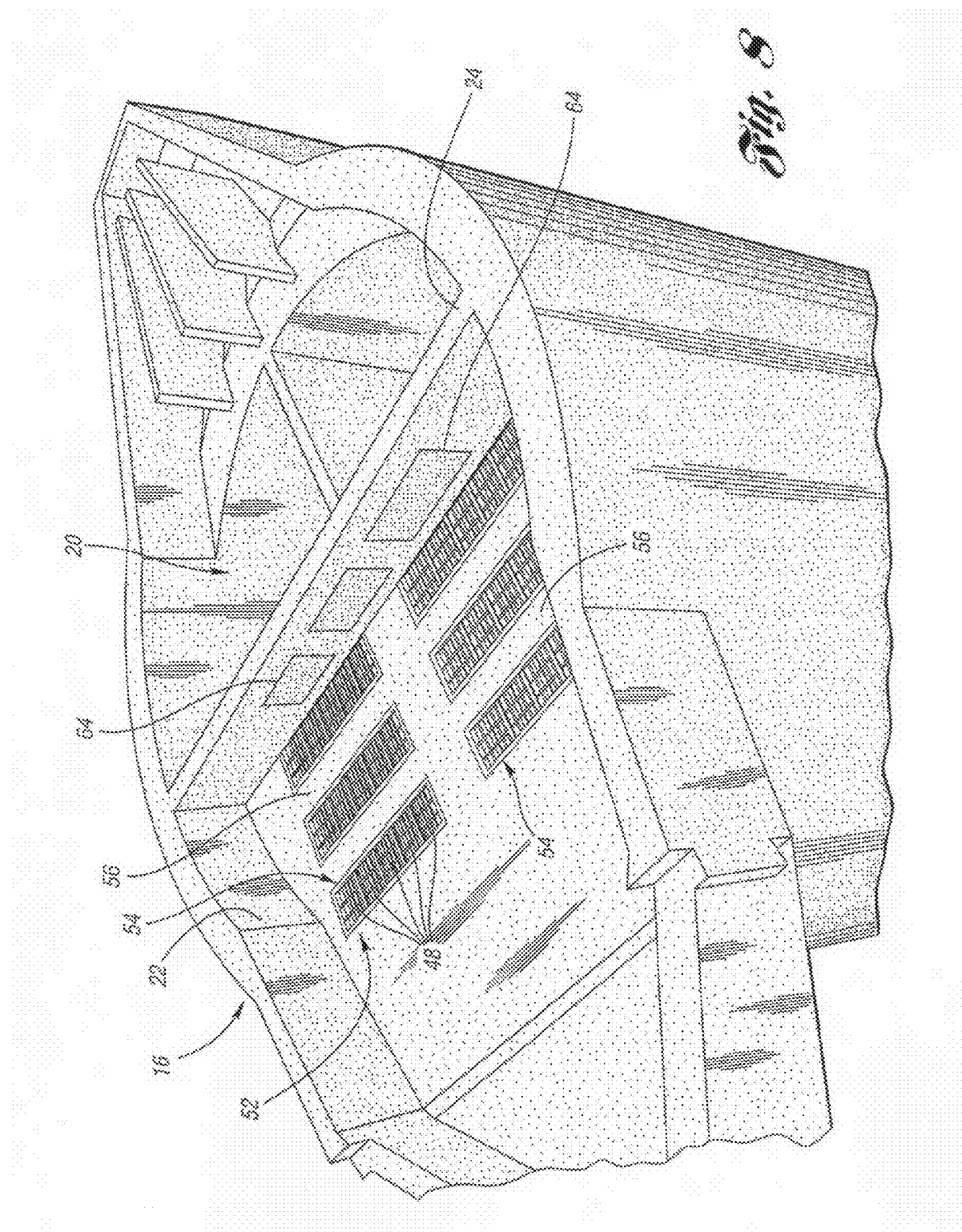
FIG. 8 is a perspective view of a top portion of the shaft structure and a screen arrangement disposed in the shaft structure.
Figure 9:
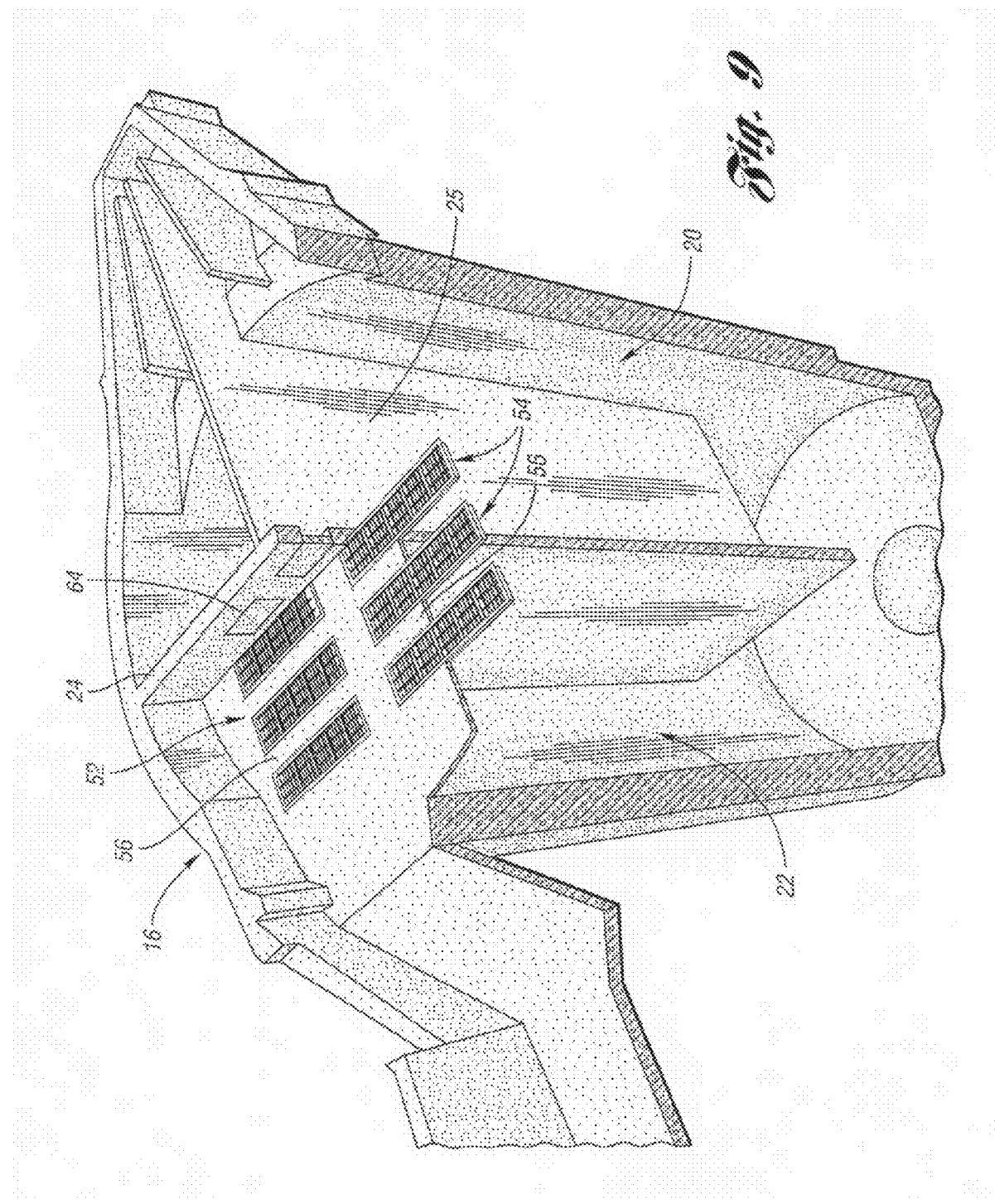
FIG. 9 is a fragmentary perspective view of the shaft structure of FIG. 8.
Figure 10:
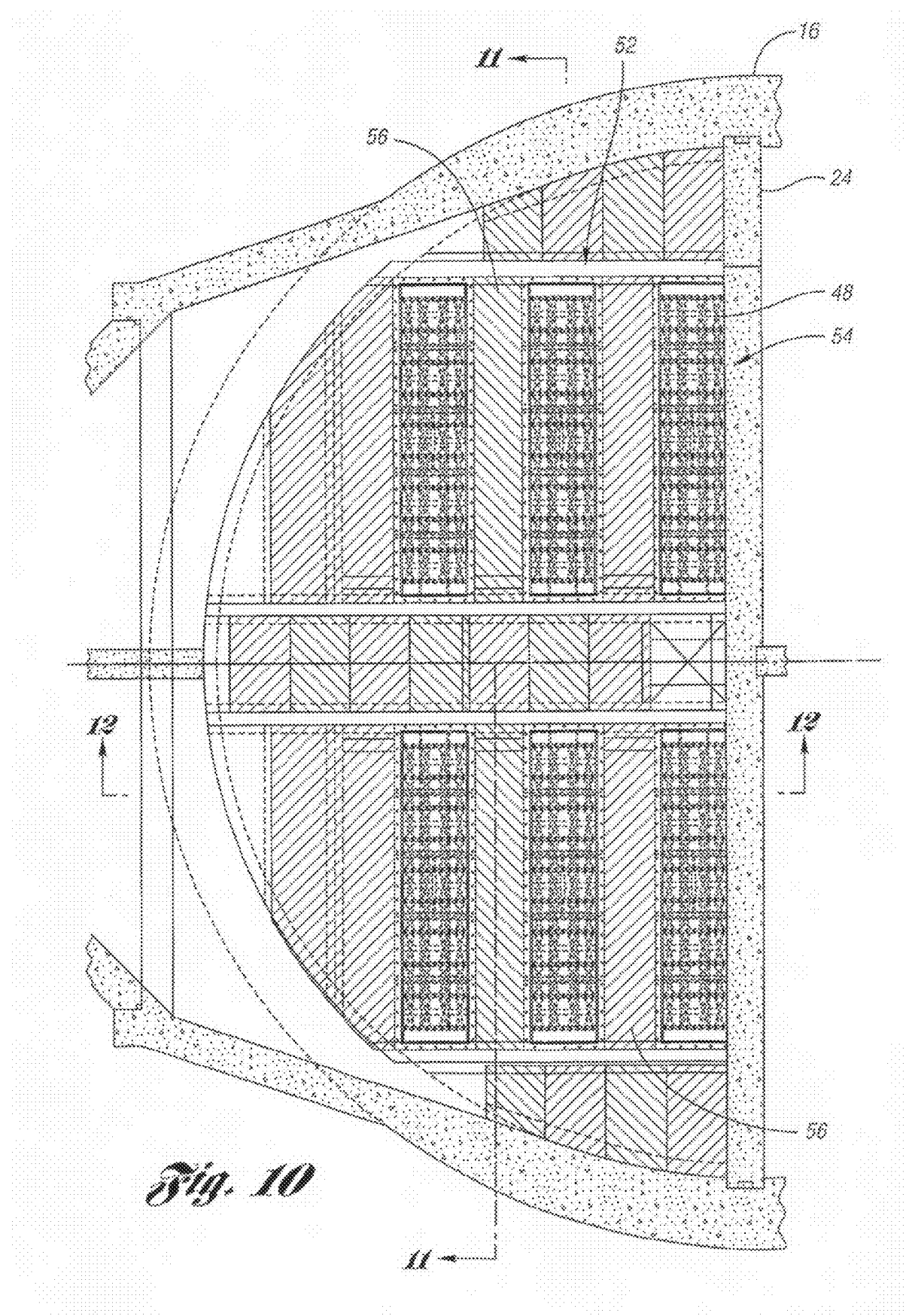
FIG. 10 is a top view of a portion of the shaft structure showing the screen arrangement.

In the event of an emergency, relief gates 64 may also be provided to allow flow to bypass the screens 48, as shown in FIGS. 8 and 9. The emergency relief gates 64 may be located above the beams 56 in the divider 24, for example. The relief gates 64 may be opened in any suitable manner, such as by gravity and/or water pressure. As another example, the relief gates 64 may be opened automatically using level sensors, control panels and/or actuators that operate mechanically or are powered by both normal and back-up power supplies. If electrical power is used to open the relief gates 64, transfer to a back-up power supply may occur automatically upon loss of normal power.

Referring to FIG. 5, the treatment system 10 is configured to enable sufficient contact time to occur between the treating agent and the excess wastewater as the excess wastewater continuously flows from the point of treating agent injection to the point of discharge from the effluent passage 36, so as to achieve sufficient disinfection, e.g., bacteria kill, of the excess wastewater at the point of discharge. Sufficient disinfection may be achieved, for example, when the mean fecal coliform bacteria level is less than 400 counts per 100 milliliters of excess wastewater, or other suitable level.

In one embodiment of the invention, the treatment system 10 may be configured to provide a total contact time in the range of 10 to 30 minutes for design storm flow rates, which may include contact time that occurs in the influent passage 14, the shaft structure 16 and/or the effluent passage 36. Alternatively, the treatment system 10 may be configured to provide any suitable contact time, such as a contact time of less than 10 minutes or greater than 30 minutes, so as to achieve a desired disinfection level. A majority of the contact time, if not all of the contact time, may be provided by the shaft structure 16, which is configured to delay flow of excess wastewater therethrough. The delay is achieved, for example, by allowing the excess wastewater to flow generally in a first direction, such as downwardly, through the first passage 20, and then generally in a second direction, such as upwardly, through the second passage 22. In one embodiment of the invention, the shaft structure 16 may be configured to provide an upward flow rate in the second passage 22 in the range of 0.05 to 1.0 feet per second, for a flow rate into the influent passage 14 in the range of 5,000 to 1,500,000 gallons per minute.

As the excess wastewater flows through the first passage 20, floatable matter that is not trapped by the screens 46 will remain at the top of the first passage 20. Furthermore, as the excess wastewater flows through the shaft structure 16 from the first passage 20 to the second passage 22, relatively heavy solids not removed by the screens 46 may settle at the bottom of the shaft structure 16.

The treatment system 10 may also be configured to provide dechlorination of the excess wastewater before discharging the excess wastewater to the river 38, or other suitable area. For example, referring to FIG. 5, the treatment system 10 may include a dechlorinating agent dispenser, such as a dechlorinating agent injection system 66, for introducing a dechlorinating agent, such as sulfate, into the effluent passage 36. The dechlorinating agent injection system 66 may be controlled by the controller 28, or by other suitable means, so that the dechlorinating agent will be introduced at a suitable point. Because dechlorination does not require much, if any, contact time, the dechlorinating agent may be introduced into the effluent passage 36 proximate to the discharge point of the effluent passage 36.

Figure 6:
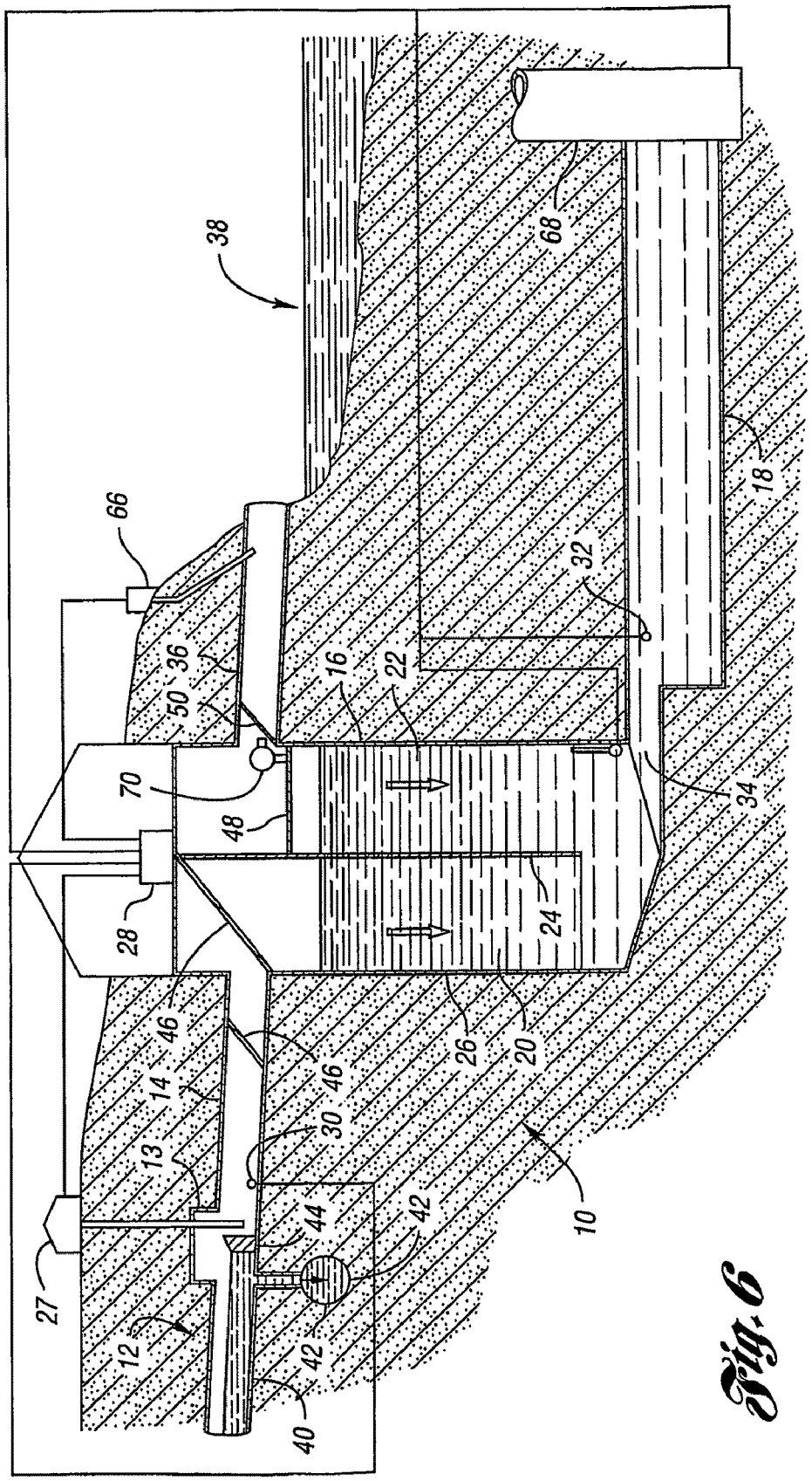
FIG. 6 is a schematic view of the treatment system after the rain event has subsided, and showing the tunnel and the shaft structure being dewatered.

As the rain event subsides, the capacity of the interceptor 42 will no longer be exceeded, and flow to the shaft structure 16 will cease. Referring to FIG. 6, dewatering of the tunnel 18 and shaft structure 16 may begin when the interceptor 42, or other suitable passage, has the capacity to accept dewatering flow rates. The dewatering process may begin by disposing all of the matter that was collected by the screens 46, 48 and 50 into the shaft structure 16. For example, collected matter may be combed, brushed, or otherwise scraped from the screens 46, 48 and 50. Alternatively, such matter may be removed from the screens 46, 48 and 50 and disposed of elsewhere. A dewatering pumping station 68 in fluid communication with the tunnel 18 may then be used to dewater the shaft structure 16 and tunnel 18. The pumping station 68 may be used to pump excess wastewater from the tunnel 18 to the interceptor 42 and/or to another suitable passage so as to route the excess wastewater to the wastewater treatment plant (not shown).

Figure 7:
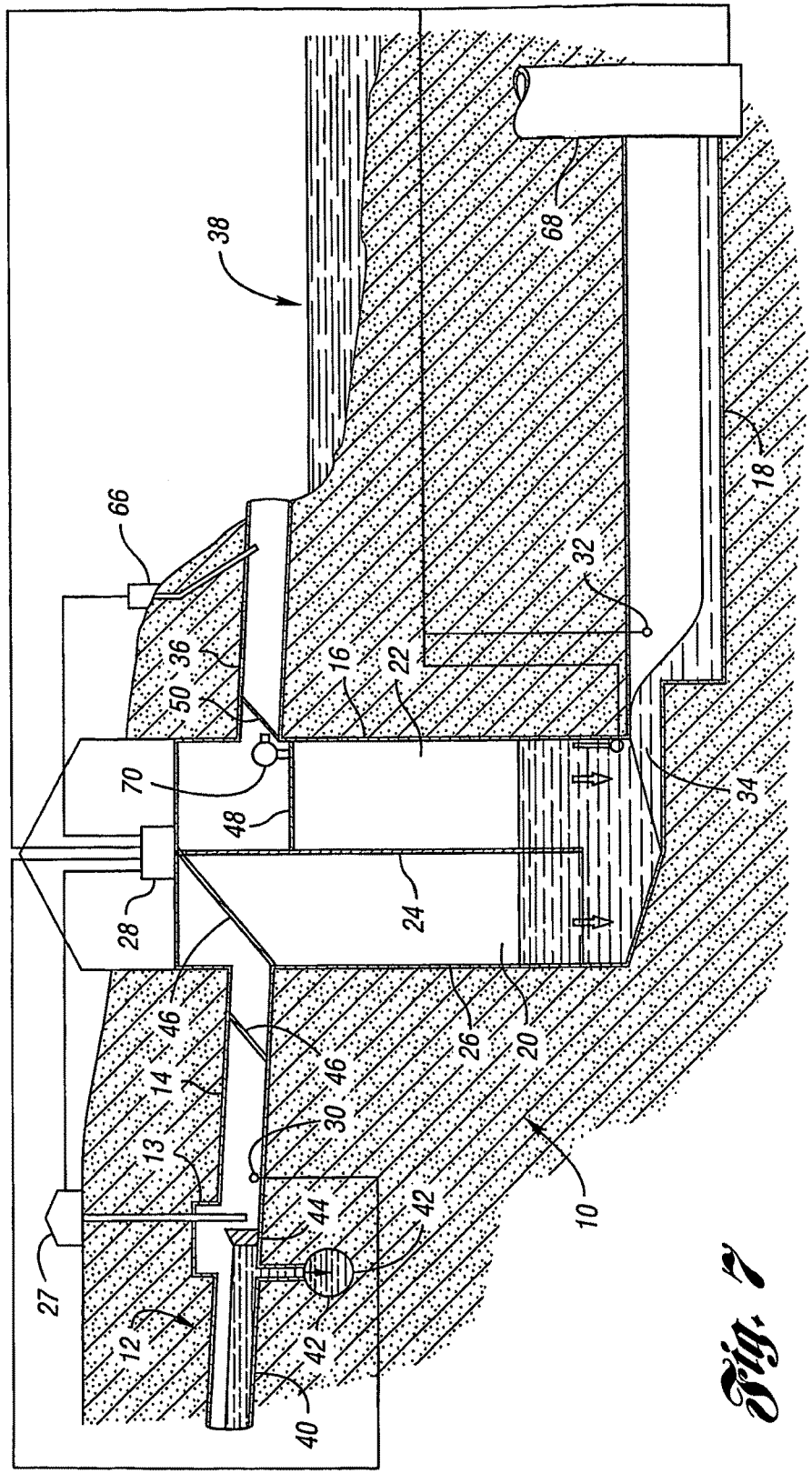
FIG. 7 is a schematic view of the treatment system showing a tunnel flushing operation.

Referring to FIG. 7, if a flushing event is desired, a certain amount of the excess wastewater may be retained in the shaft structure 16 for flushing the tunnel 18. For example, by closing the gate 34 before dewatering the tunnel 18, the tunnel 18 may be dewatered without completely dewatering the shaft structure 16. The gate 34 may then be opened so as to allow the excess wastewater contained in the shaft structure 16 to flush through the tunnel 18.

Because the shaft structure 16 may be configured to provide relatively small vertical flow velocities, head losses caused by the shaft structure 16 may be relatively small. For example, head losses associated with the shaft structure 16 may be less than 3 feet, and more particularly less than 1 foot, in a system capable of handling at least 100,000 to 10,000,000 gallons per minute or more. As a result, head drop between the influent passage 14 and the effluent passage 36 may be relatively small. Consequently, depending on flow rates and available head provided by the sewer system 12, the treatment system 10 may operate as a gravity feed system, wherein excess wastewater may flow through the shaft structure 16 and out the effluent passage 36 without requiring pumping. Furthermore, low flow velocities through the shaft structure 16 also enable solids to settle at the bottom of the shaft structure 16. Alternatively, the treatment system 10 may include a pump 70 for pumping excess wastewater from the second passage 22 into the effluent passage 36.

In addition, because the shaft structure 16 may be large in size, the shaft structure 16 may provide surge protection. More. Specifically, surge energy developed during filling of the tunnel 18 may be effectively dissipated within the shaft structure 16. Moreover, because the shaft structure 16 may be large in size, the shaft structure 16 may provide air relief as excess wastewater flows through the shaft structure 16 into the tunnel 18.

Because flow of excess wastewater may be diverted from the first passage 20 to the second passage 22 when flow to the tunnel 18 is inhibited, flow through the shaft structure 16 may occur without displacing the first quantity of excess wastewater contained in the tunnel 18. Thus, the first quantity of excess wastewater or "first flush," which may have a high percentage of total suspended solids, may be contained in the tunnel 18 during an overflow event. Furthermore, because the first quantity of excess wastewater does not have to be discharged to the river 38, the first quantity of excess wastewater does not have to be treated with a treating agent. Thus, injection of a treating agent may be limited only to rain events that will result in an overflow to the river 38. Alternatively, the first quantity of excess wastewater may also be treated with a treating agent.

The treatment system 10 also enables the tunnel 18 to be flushed easily, as explained above, using wastewater from the shaft structure 16. Thus, the tunnel 18 may be flushed without requiring additional water to be introduced into the treatment system 10 from another source.

Alternatively, the tunnel 18 may be deleted if not required for a particular application. In such a case, excess wastewater may flow from the sewer system 12 into the shaft structure 16, and then into the effluent passage 36, such as described above in detail. Furthermore, one or more submersible pumps 71 may be positioned at or near the bottom of the shaft structure 16 to dewater the shaft structure 16

Figure 15:
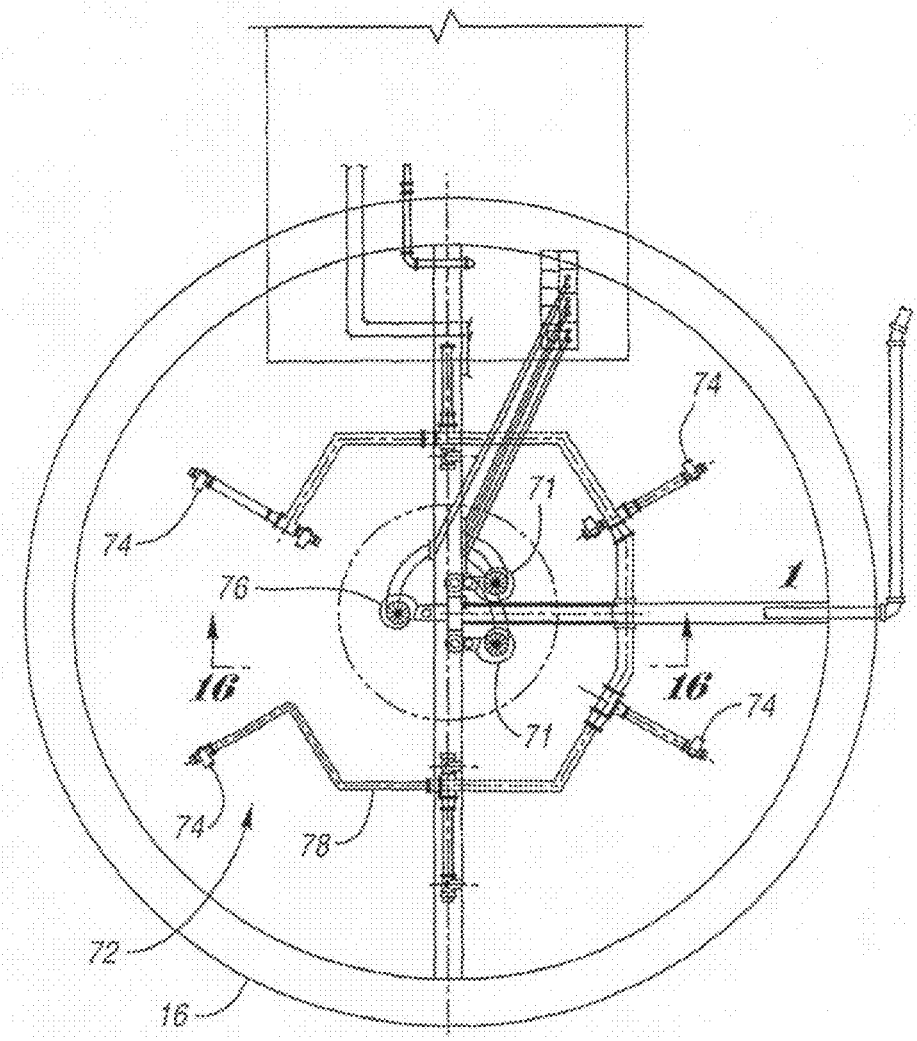
FIG. 15 is a cross-sectional view of the shaft structure showing a flushing system.
Figure 16:
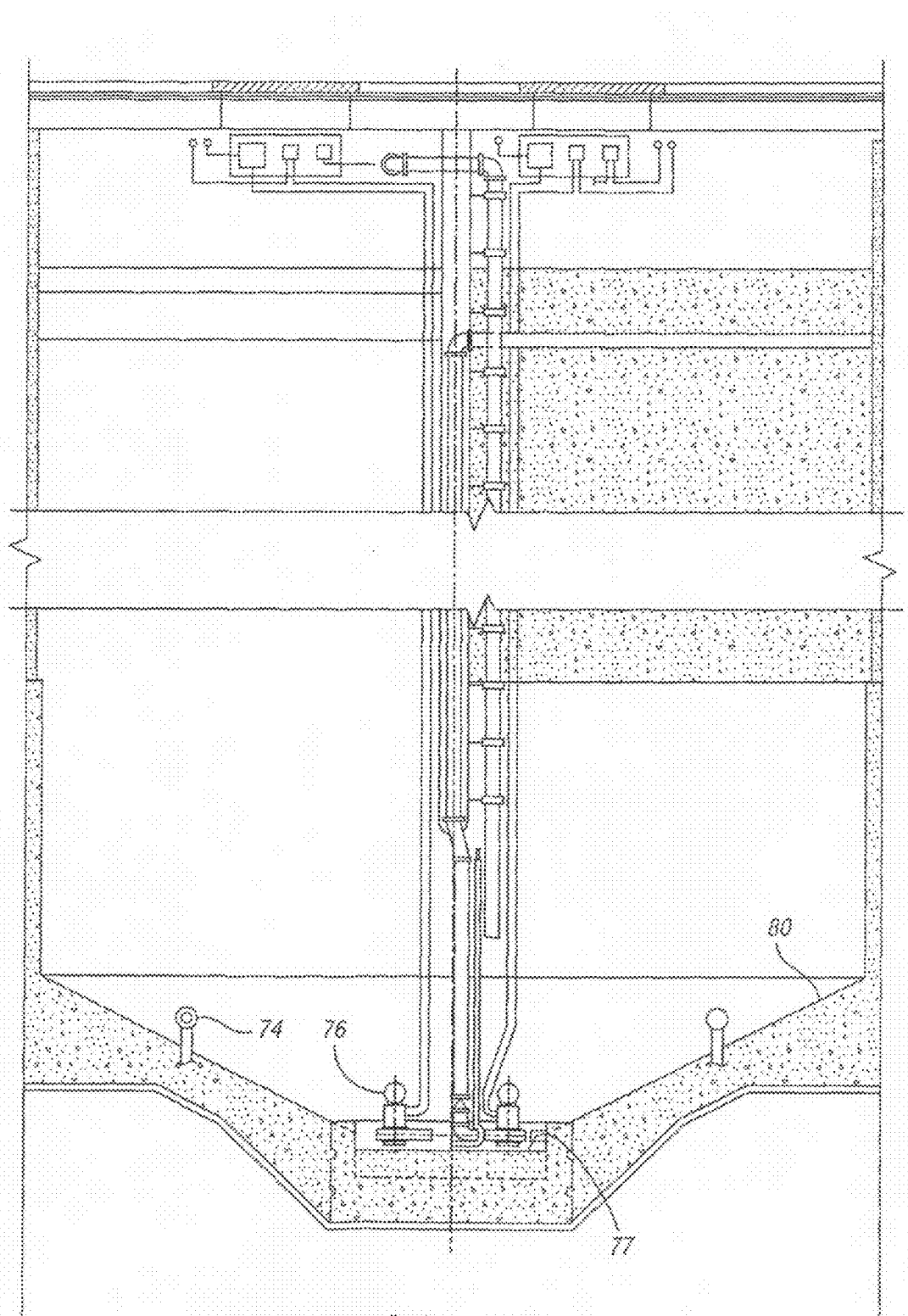
FIG. 16 is a cross-sectional view taken along line 16-16 of FIG. 15.

Referring to FIGS. 15 and 16, the treatment system 10 may also include a flushing system 72 for flushing the shaft structure 16. For example, the flushing system 72 may include multiple spray heads or nozzles 74 mounted in the shaft structure 16 above bottom 77 of the shaft structure 16, such as one to four feet above the bottom 77 of the shaft structure 16. In one embodiment, the nozzles 74 may be mounted on a sidewall or bottom portion of the shaft structure 16. The flushing system 72 may further include a submersible chopper pump 76 to route contents of the shaft structure 16 through any suitable passage, such as a header 78, to the nozzles 74 located above the shaft bottom.

The flushing system 72 may be designed with sufficient energy to mix the contents of the shaft structure 16 within a bottom section 80 of the shaft structure 16. For example, the nozzles 74 may be oriented generally in one direction to facilitate mixing within the bottom section 80 of the shaft structure 16, which section 80 may be sloped or conical in shape, for instance, to further facilitate mixing. In the embodiment shown in FIG. 15, the nozzles 74 face generally in a counter-clockwise direction such that the nozzles 74 create a counter-clockwise flow direction in the bottom section 80 of the shaft structure 16. The nozzles 74 may also be configured to create uniform rotation, as well as a vertical-axis vortex to facilitate mixing in the shaft structure 16. Suitable nozzles are available from Vaughan Co., Inc. of Montesano, Wash., for example.

The flushing system 72 may be operated, for example, when the water level within the shaft structure has been dewatered to the top of the bottom section 80. It is anticipated that the flushing system will create sufficient velocity along the shaft floor to cause the re-suspension of solids (scour) that might have deposited on the shaft floor during dewatering. Typically, a sewer may be designed with a velocity of 2 ft/sec to resuspend any material that may have settled within the sewer during low flow conditions.

As another example, one or more tipping or dump buckets located above the high water level may be used to flush the shaft structure 16. As yet another example, a flushing system including one or more high pressure nozzles connected to one or more pumps that obtain water from an outside source, such as river water or a potable water supply, may be used to flush the shaft structure 16.

Figure 17:
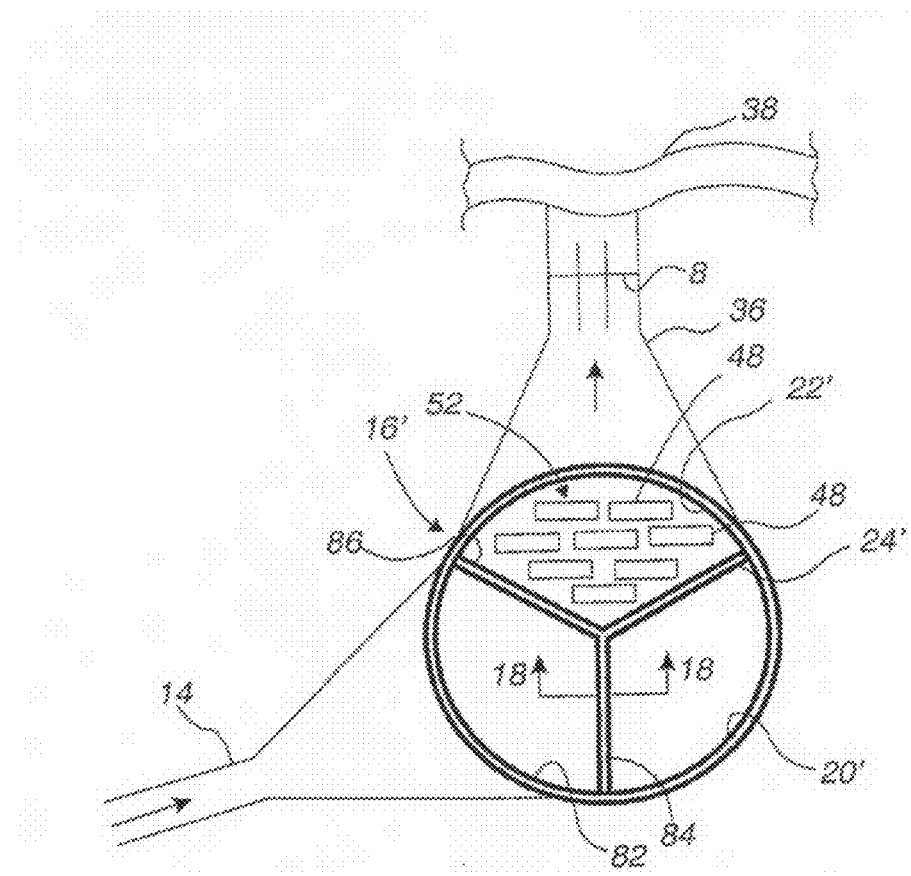
FIG. 17 is a schematic top view of an additional embodiment of the shaft structure.
Figure 18:
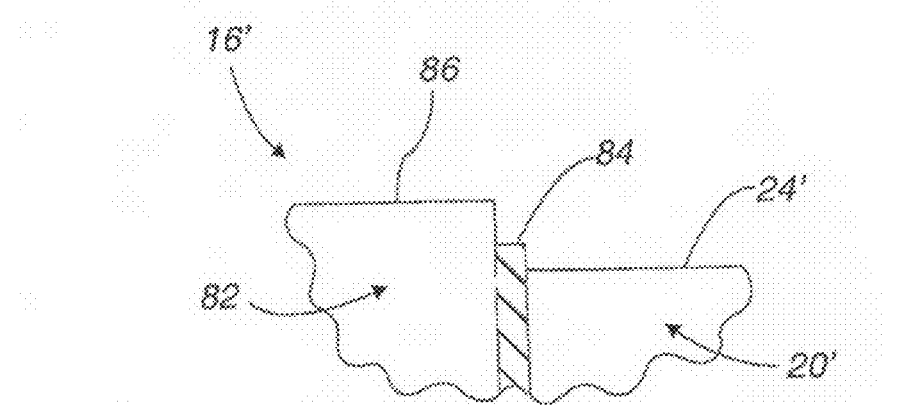
FIG. 18 is a schematic fragmentary cross-sectional view of the shaft structure of FIG. 17.

Referring to FIGS. 17 and 18, an additional embodiment 16' of the shaft structure is shown, and the shaft structure 16' may have similar dimensions and characteristics as described above for the shaft structure 16. The shaft structure 16' is configured to receive the first quantity of excess wastewater or "first flush," without allowing the first flush to discharge to the river 38 or other suitable area. The shaft structure 16' includes first and second generally vertically oriented passages 20' and 22', that are separated by divider 24', such as a baffle wall, which is configured to allow flow from the first passage 20' to the second passage 22' proximate the bottom of shaft structure 16'. The shaft structure 16' also includes a generally vertically oriented third passage 82 that is separated from the first and second passages 20' and 22', respectively, by dividers 84 and 86, respectively, that each extend to the bottom of shaft structure 16'. Divider 84 has a height less than the height of divider 86, and both dividers 84 and 86 may extend above divider 24'.

Furthermore, dividers 82-86 may have any suitable configuration. For example, each divider may be formed as a generally straight wall as shown in FIG. 17. As another example, dividers 84 and 86 may be formed as one generally curved or arcuate wall that provides beneficial structural characteristics.

With the above shaft structure configuration, influent passage 14 may be designed to direct flow to third passage 82, such that third passage 82 receives the first flush. When the third passage 82 is filled to the height of divider 84, continued flow will result in wastewater flowing over divider 84 and into first passage 20'. Just before the third passage 82 is filled, or at any other suitable time such as described above, treating agent may be introduced into the wastewater to disinfect the wastewater in a similar manner as described above in detail. Flow may then continue in a similar manner as described above with respect to shaft structure 16. More specifically, if the rain event continues, excess wastewater will flow through the first passage 20', under or through divider wall 24' and into second passage 22'. Eventually, if the rain event continues, treated excess wastewater will flow through screen arrangement 52, into the effluent passage 36 for discharge into river 38 or any other suitable area. One-way gates, such as flap gates 88, may also be provided in the effluent passage 36 to inhibit flow from the river 38 into the shaft structure 16'

When the rain event subsides, the shaft structure 16' may be dewatered and flushed in a similar manner as described above for shaft 16. For example, one or more dewatering pumps, such as submersible chopper pumps (not shown), may be positioned at or near the bottom of shaft structure 16', such that at least one pump is disposed in third passage 82 and at least another pump is disposed outside of third passage 82.

While the first, second and third passages 20', 22' and 82, respectively, are shown integrally formed as a single shaft structure, the passages 20', 22' and 82 may be formed as multiple shaft structures. For example, the third passage 82 may be formed by a shaft structure that is spaced apart from another shaft structure that defines the first and second passages 20' and 22', respectively. In such an embodiment, an upper end of the third passage 82 may be connected to an upper end of the first passage 20' with a generally horizontal connector passage that slopes slightly downward toward the first passage 20'.

As another example, the passages 20', 22' and 82 may each be formed as a separate shaft structure, and the shaft structures may be spaced apart from each other and connected by connector passages. More specifically, an upper end of the third passage 82 may be connected to an upper end of the first passage 20' with a generally horizontal connector passage that slopes slightly downward toward the first passage 20', and a lower end of the first passage 20' may be connected to a lower end of the second passage 22' with a generally horizontal connector passage that slopes slightly downward toward the second passage 22'.

Referring to FIGS. 19-23, an additional embodiment 110 of a wastewater treatment system according to the invention is shown for treating excess wastewater from a sewer system 112. Sewer system 112 may be, for example, a combined sewer that is designed to carry both sanitary sewage and storm water runoff (combined sewer overflow), or a sanitary sewer system that experiences increased flows during a rain event (sanitary sewer overflow). Such a sanitary sewer system may experience increased flows due to storm water infiltration into the sanitary sewer system. The term "wastewater" as used in the application refers to sanitary sewage and/or storm water runoff.

The wastewater treatment system 110 includes a diversion chamber 113 and an influent passage 114 for receiving excess wastewater, such as wastewater overflow, from the sewer system 112. The treatment system 110 further includes a container having first and second spaced apart portions, such as first and second shaft structures 115 and 116, respectively, in fluid communication with the influent passage 114, and connected together by a connector passage 117.

In one embodiment of the invention, the shaft structures 115 and 116 are disposed substantially or entirely below ground and are oriented generally vertically. For example, each shaft structure 115 and 116 may have a longitudinal axis that is coincident with a vertical line or that extends at an angle with respect to a vertical line. While the shaft structures 115 and 116 may have any suitable configuration, in one embodiment of the invention, each shaft structure 115 and 116 has a generally circular horizontal cross-section having a diameter in the range of 10 to 200 feet. Alternatively, each shaft structure 115 and 116 may have a cross-section that defines any suitable shape, such as a hexagon, octagon, ellipse, or rectangle, and that has any suitable hydraulic diameter, such as a hydraulic diameter in the range of 5 to 200 feet. In addition, each shaft structure 115 and 116 may have any suitable length, such as a generally vertical length in the range of 30 to 200 feet.

The shaft structures 115 and 116 may have generally the same size and shape. Alternatively, the shaft structures 115 and 116 may have different sizes and/or shapes. For example, the first shaft structure 115 may have a smaller hydraulic diameter than the second shaft structure 116. As a more detailed example, the first shaft structure 115 may have a hydraulic diameter in the range of 5 to 40 feet, and the second shaft structure 116 may have a hydraulic diameter in the range of 20 to 200 feet.

Furthermore, each shaft structure 115 and 116 may be made of concrete, and/or any other suitable material such as steel. For example, each shaft structure 115 and 116 may comprise a plurality of concrete rings that are stacked on top of each other in a sealed relationship.

The connector passage 117 may extend generally horizontally, and may be connected to each shaft structure 115 and 116 proximate a lower end of each shaft structure 115 and 116. Furthermore, the connector passage 117 may have any suitable configuration for allowing wastewater to flow between the shaft structures 115 and 116. For example, the connector passage 117 may be a generally cylindrical structure having a cross-section that defines any suitable shape, such as a circle, hexagon, octagon, ellipse, or rectangle. The connector passage 117 may also have any suitable hydraulic diameter, such as a hydraulic diameter in the range of 5 to 30 feet, and any suitable length, such as a length in the range of 1 to 500 feet. Moreover, the connector passage 117 may comprise concrete and/or any other suitable material, such as steel.

With the above configuration, the volume defined by each shaft structure 115 and 116 may be greater than the volume defined by the connector passage. For example, the volume defined by each shaft structure 115 and 116 may be at least double the volume defined by the connector passage 117.

The treatment system 110 also includes a treating agent dispenser, such as a treating agent injection system 118, for injecting or otherwise introducing a treating agent, such as chlorine or a solution that includes chlorine, into the excess wastewater so as to treat the excess wastewater. For example, the treating agent may be a sodium hypochlorite disinfection solution that is used to disinfect the excess wastewater. The treating agent injection system 118 may also include a mixer (not shown) disposed at or near the point of injection for mixing the treating agent with the excess wastewater. The mixer may include, for example, a bubbler and/or a mechanical mixer.

The treatment system 110 may also include a computer control system, such as a controller 120, in communication with the treating agent injection system 118 for controlling introduction of the treating agent. The controller 120 may also be in communication with a flow sensor 122 disposed in the influent passage 114.

While the treating agent injection system 118 and controller 120 may each be disposed in any suitable position, in the embodiment shown in FIG. 19, the treating agent injection system 118 is located proximate the influent passage 114 and the controller 120 is disposed proximate the second shaft structure 116. As another example, the treating agent injection system 118 and controller 120 may each be disposed proximate, such as on top of, either shaft structure 115 or 116. Furthermore, the treating agent injection system 118 and controller 120 may be housed in the same or separate structures or enclosures.

An effluent passage 124 is in fluid communication with the second shaft structure 116. The effluent passage 124 may be used to discharge treated wastewater from the treatment system 110 to a river 126 or any other suitable area, such as another receiving water body.

Figure 21:
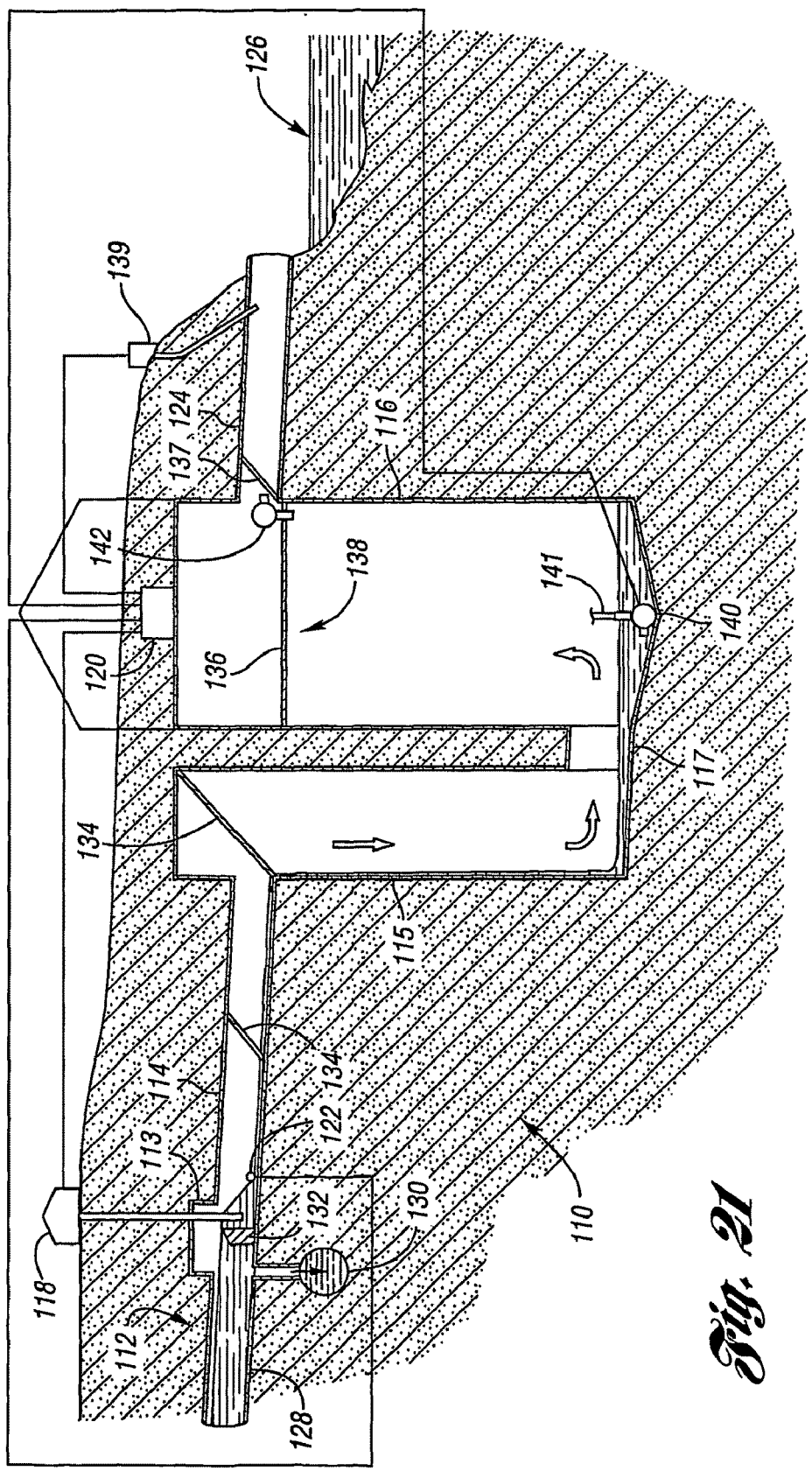
FIG. 21 is a schematic view of the treatment system during a rain event showing excess wastewater flowing from the sewer system into the shaft structures.

Referring to FIGS. 19-23, operation of the treatment system 110 will now be described in detail. Under normal operating conditions, such as during dry weather conditions, wastewater flows through trunk sewer 128 of the sewer system 112 and into an interceptor 130 as shown in FIG. 19. The interceptor 130 carries wastewater to a treatment facility, such as a wastewater treatment plant (not shown). During a sufficient rain event, flow from the trunk sewer 128 will exceed capacity of the interceptor 130, and excess wastewater will flow into influent passage 114. As shown in FIG. 21, for example, excess wastewater may flow over a weir 132 in diversion chamber 113 and into influent passage 114. Advantageously, the treatment system 110 may be configured to handle a relatively large flow rate, such as a flow rate in the range of 2,000 to 1,500,000 gallons per minute.

When flow is detected by the flow sensor 122, for example, the controller 120 may cause the treating agent injection system 118 to initiate injection of the treating agent into the excess wastewater. The treating agent may be injected at any suitable rate, such as a rate sufficient to achieve a treating agent level in the range of 10 to 25 milligrams per liter of excess wastewater, for example. Mixers of the treating agent injection system 120 may also be used to enhance mixing of the treating agent with the excess wastewater. Such mixers may be located, for example, at and/or downstream of the point of treating agent injection.

Alternatively, treating agent injection may begin at any suitable time, such as immediately upon flow exceeding capacity of the interceptor 130, or any time thereafter, such is when flow is detected in one or both of the shaft structures 115 and 116. Furthermore, treating agent injection may occur at any suitable point, such as upstream of the shaft structures 115 and 116, within one or both of the shaft structures 115 and 116, and/or within the connector passage 117. For example, treating agent injection may occur upstream of the weir 132 to facilitate mixing of the treating agent with the excess wastewater.

After flowing over the weir 132, excess wastewater may then flow through one or more screens 134, such as inclined, vertical and/or horizontal screens, located in the influent passage 114 and/or first shaft structure 115 so as to remove floatable matter and/or suspended solids from the excess wastewater. Excess wastewater may then flow generally in a first direction, such as downward, in the first shaft structure 115, through the connector passage 117 and then generally in a second direction, such as upward, in the second shaft structure 116.

Figure 22:
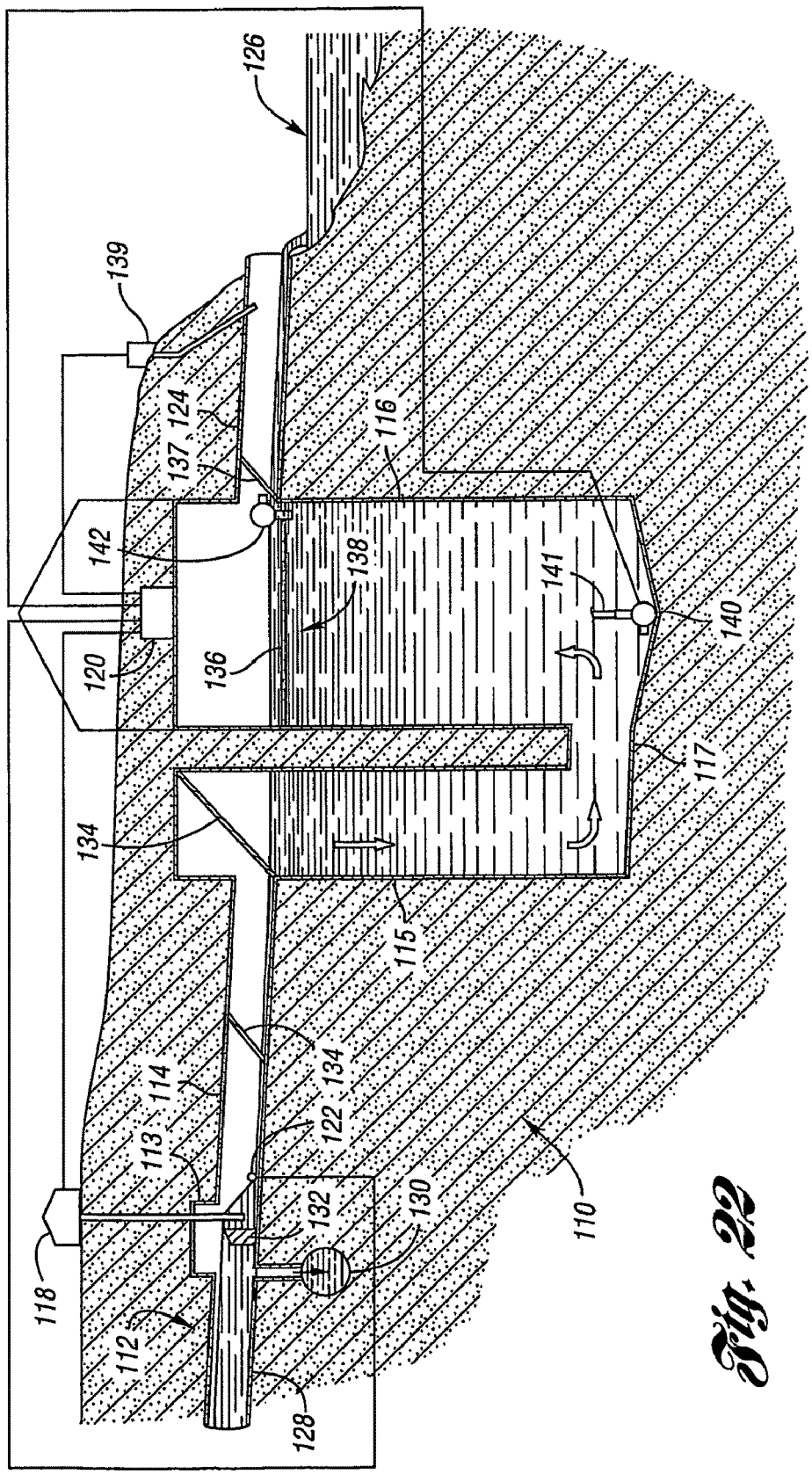
FIG. 22 is a schematic view of the treatment system showing excess wastewater passing from the second shaft structure to an effluent passage in fluid communication with the second shaft structure.

If the rain event continues, excess wastewater will flow through the first shaft structure 115, through the connector passage 117 and into the second shaft structure 116 until the second shaft structure 116 reaches capacity. Eventually, if the rain event continues, treated excess wastewater will flow into the effluent passage 124 and then into the river 126, as shown in FIG. 22. The treatment system 110 may include one or more screens 136, such as inclined, vertical and/or horizontal screens, disposed in the second shaft structure 116, and/or one or more screens 137, such as inclined, vertical and/or horizontal screens, disposed in the effluent passage 124 for removing floatables and/or suspended solids from the treated excess wastewater. Such screens 136 and/or 137 may be provided as an alternative to or in addition to the screens 134 located in the influent passage 114 and/or first shaft structure 115.

In the embodiment shown in FIGS. 19-23, the one or more screens 136 provided in the second shaft structure 116 are arranged in a generally horizontally oriented screen arrangement 138 that is positioned proximate an upper end of the shaft structure 116. The screen arrangement 138 may have any suitable configuration, such as the configuration described above for screen arrangement 52.

The treatment system 110 is configured to enable sufficient contact time to occur between the treating agent and the excess wastewater as the excess wastewater continuously flows from the point of treating agent injection to the point of discharge from the effluent passage 124, so as to achieve sufficient disinfection, e.g., bacteria kill, of the excess wastewater at the point of discharge. Sufficient disinfection may be achieved, for example, when the mean fecal coliform bacteria level is less than 400 counts per 100 milliliters of excess wastewater, or other suitable level.

In one embodiment of the invention, the treatment system 110 may be configured to provide a total contact time in the range of 10 to 30 minutes, which may include contact time that occurs in sewer system 112, the influent passage 114, the shaft structures 115 and 116, the connector passage 117 and/or the effluent passage 124. Alternatively, the treatment system 110 may be configured to provide any suitable contact time, such as a contact time of less than 10 minutes or greater than 30 minutes, so as to achieve a desired disinfection level.

A majority of the contact time, if not all of the contact time, may be provided by the shaft structures 115 and 116 and connector passage 117. Furthermore, in contrast to a prior system having a generally horizontal flow through tunnel where the majority of contact time is provided in the tunnel as compared to corresponding drop and riser shafts, the shaft structures 115 and 116 of the treatment system 110 may be configured to provide a majority of the contact time as compared to the connector passage 117. For example, the flow time through the shaft structures 115 and 116 may be at least double the flow time through the connector passage 117. As another example, flow time through each shaft structure 115 and 116 may be at least double the flow time through the connector passage 117.

With the connector passage 117 disposed proximate lower ends of the shaft structures 115 and 116, excess wastewater may flow generally downwardly through the first shaft structure 115, and then generally upwardly through the second shaft structure 116 after passing through the connector passage 117. In one embodiment of the invention, the second shaft structure 116 may be configured to provide an upward flow rate in the range of 0.05 to 1.0 feet per second, for a flow rate into the influent passage 114 in the range of 2,000 to 1,500,000 gallons per minute.

As the excess wastewater flows through the first shaft structure 115, floatable matter that is not trapped by the screens 134 may remain proximate an upper end of the first shaft structure 115. Furthermore, as the excess wastewater flows through shaft structures 115 and 116, relatively heavy solids not removed by the screens 134 and 136 may settle at the bottom of one or both of the shaft structures 115 and 116.

The treatment system 110 may also be configured to provide dechlorination of the excess wastewater before discharging the excess wastewater to the river 126, or other suitable area. For example, the treatment system 110 may include a dechlorinating agent dispenser, such as a dechlorinating agent injection system 139, for introducing a dechlorinating agent, such as sulfate, into the effluent passage 124. The dechlorinating agent injection system 139 may be controlled by the controller 120, or by other suitable means, so that the dechlorinating agent will be introduced at a suitable point. Because dechlorination does not require much, if any, contact time, the dechlorinating agent may be introduced into the effluent passage 124 proximate to the discharge point of the effluent passage 124.

As the rain event subsides, the capacity of the interceptor 130 will no longer be exceeded, and flow to the shaft structures 115 and 116 will cease. Dewatering of the shaft structures 115 and 116 may begin when the interceptor 130, or other suitable passage, has the capacity to accept dewatering flow rates. The dewatering process begins by disposing all of the matter that was collected by the screens 134-137 into one or both of the shaft structures 115 and 116. For example, collected matter may be combed, brushed, or otherwise scraped from the screens 134-137. Alternatively, such matter may be removed from the screens 134-137 and disposed of elsewhere. Referring to FIG. 23, one or more submersible pumps 140, for example, may then be used to pump wastewater from shaft structures 115 and 116 to a dewatering passage 141, such as one or more pipes, in fluid communication with the shaft structures 115 and 116. The dewatering passage 141 may be used to route wastewater from the shaft structures 115 and 116 to the interceptor 130 and/or to another suitable passage so as to route the excess wastewater to the wastewater treatment plant (not shown), for example. In one embodiment, the dewatering passage 141 may extend generally upwardly in the second shaft structure 116, through a side wall of the second shaft structure 116, and to the interceptor 130.

In one embodiment of the invention, the second shaft structure 116 may extend below the first shaft structure 115, and the connector passage 117 may slope downwardly toward the second shaft structure 116 to facilitate dewatering of the shaft structures 115 and 116. As another example, the first shaft structure 115 may extend below the second shaft structure 116, and the connector passage 117 may slope downwardly toward the first shaft structure 115 to facilitate dewatering of the shaft structures 115 and 116 through a dewatering passage disposed in and/or connected directly to the first shaft structure 115.

The treatment system 110 may also include a flushing system (not shown) for flushing one or both of the shaft structures 115 and 116 and/or connector passage 117 to remove sludge, for example. Such a flushing system may have any suitable configuration, such as one or more spray heads or nozzles mounted on one or more shaft side walls and connected to a submersible pump. As a more specific example, the flushing system may have a configuration similar to the configuration described above for flushing system 72. Furthermore, the flushing system may be positioned in the first shaft structure 115, the second shaft structure 116, and/or the connector passage 117. As another example, the flushing system may include one or more tipping or dump buckets located above the high water level of one or both of the shaft structures 115 and 116.

Because the shaft structures 115 and 116 may be configured to provide relatively small vertical flow velocities, head losses caused by the shaft structures 115 and 116 may be relatively small. For example, head losses associated with the shaft structures 115 and 116 may be less than 3 feet. As a result, head drop between the influent passage 114 and the effluent passage 124 may be relatively small. Consequently, depending on flow rates and available head provided by the sewer system 112, the treatment system 110 may operate as a gravity feed system, wherein excess wastewater may flow through the shaft structures 115 and 116 and out the effluent passage 124 without requiring pumping. Furthermore, low flow velocities through the shaft structures 115 and 116 also enable solids to settle at the bottom of the shaft structures 115 and 116. Alternatively, the treatment system 110 may include one or more pumps 142 for pumping excess wastewater from the second shaft structure 116 into the effluent passage 124, and/or one or more pumps (not shown) for pumping excess wastewater from the influent passage 114 into the first shaft structure 115.

The treatment system 110 may further include an additional container, such as a storage tunnel, that is in inhibitable fluid communication with one or both of the shaft structures 115 and 116. For example, the treatment system 110 may include a tunnel 144 (shown in phantom lines in FIG. 19) connected to the second shaft structure 116 at or near the lower end of the second shaft structure 116. Such a tunnel may be used, for example, to receive a first quantity of excess wastewater or "first flush," which may have a high percentage of total suspended solids. When excess wastewater received in the tunnel 144 reaches a predetermined level, flow to the tunnel 144 may be inhibited, such as by using an automatic gate disposed proximate the junction of the tunnel 144 with the second shaft structure 116. As another example, flow into the tunnel 144 may be inhibited when the tunnel 144 reaches capacity. When flow into the tunnel 144 is inhibited, wastewater may then flow from the first shaft structure 115 to the second shaft structure 116, and then into the effluent passage 124, as described above in detail. Further details regarding the use of such a tunnel are disclosed in U.S. Pat. No. 6,503,404, which is hereby incorporated by reference in its entirety.

Moreover, the treatment system 110 may include more than two spaced apart shaft structures for further increasing flow time and/or contact time. For example, the treatment system 110 may include third and fourth shaft structures (not shown) located proximate the shaft structures 115 and 116. The third shaft structure may be connected to the second shaft structure 116 with a connector passage located proximate upper ends of the second shaft structure 116 and third shaft structure. Likewise, the fourth shaft structure may be connected to the third shaft structure with a connector passage located proximate lower ends of the third and fourth shaft structures.

As another example, a divided shaft structure, such as disclosed in U.S. Pat. No. 6,503,404, may be used in conjunction with the shaft structures 115 and 116. More specifically, such a divided shaft structure may be connected upstream of the first shaft structure 115, and/or downstream of the second shaft structure.

FIG. 24 shows a wastewater storage or receiving system 150, according to another aspect of the invention, for receiving excess wastewater from a sewer system, such as sewer system 112 described above, through an influent passage 152. The system 150 includes a generally vertically oriented shaft structure 154 adapted to receive excess wastewater from the sewer system, and an effluent passage 156 in fluid communication with the shaft structure 154.

In this embodiment, treating agent, such as described above, may be added to the excess wastewater upstream of the shaft structure 154 a sufficient distance to achieve necessary contact time prior to the wastewater reaching the shaft structure 154. The treating agent may be injected or otherwise introduced to the wastewater by a treating agent dispenser 118'.

The shaft structure 154 is configured to receive wastewater, such as pretreated wastewater, in relatively large quantities, such as 500,000 gallons to 20,000,000 gallons or more. As another example, the shaft structure 154 may be configured to receive less than 500,000 gallons of wastewater. Furthermore, the shaft structure 154 is configured to allow treated wastewater to be discharged through the effluent passage 156 to a river 157 or any other suitable area, such as another receiving water body, when the wastewater received by the shaft structure 154 reaches a predetermined level.

The shaft structure 154 may have a cross-section that defines any suitable shape, such as a circle, hexagon, octagon, ellipse, or rectangle. Furthermore, the shaft structure 154 may have any suitable hydraulic diameter D and a height H (measured from the bottom of the shaft structure 154 to the bottom of the effluent passage 156 at the junction of the effluent passage 156 with the shaft structure 154) that is greater than at least 50% of the hydraulic diameter D. For example, the hydraulic diameter D may be in the range of 30 to 200 feet, and the height H may be in the range of 50 to 200 feet. In one embodiment, the height H is at least 70% of the hydraulic diameter D, and in another embodiment, the height H is at least 110% of the hydraulic diameter D.

During a sufficient rain event, excess wastewater flows from the sewer system through the influent passage 152 and into the shaft structure 154, such that when the shaft structure 154 reaches a predetermined fill level, the wastewater flows across the shaft structure 154 and into the effluent passage 156. The system 150 may also include one or more screens 158 for filtering the wastewater prior to being discharged.

After the rain event has subsided, the shaft structure 154 may be dewatered in a similar manner as described above with respect to the system 110. For example, the wasterwater contained in the shaft structure 154 may be pumped to the sewer system 112 using one or more submersible pumps 140' connected to dewatering passage 141'. Furthermore, the shaft structure 154 may be flushed in a similar manner as described above with respect to the system 110.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the one or more screens 46 of the treatment system 10 may have a similar configuration as described above with respect to the screen arrangement 52. As another example, the container of the wastewater treatment system according to the invention may have any suitable configuration, such as any of the configurations described in U.S. Pat. No. 6,503,404, which is hereby incorporated by reference in its entirety.

What is claimed is:

1. A wastewater treatment system for treating excess wastewater from a sewer system, the wastewater treatment system comprising:

a treating agent dispenser for introducing a treating agent into the wastewater;

a container adapted to receive excess wastewater from the sewer system, the container having first and second portions that each have an upper end and a lower end, the lower ends being interconnected;

a generally horizontally oriented screen arrangement disposed in the second portion of the container, the screen arrangement including multiple screens that each have a lower surface, and a support structure for supporting the screens, the support structure including a raised portion defining a downwardly facing recess that extends above the lower surfaces of the screens for trapping debris carried by the wastewater; and an effluent discharge passage in fluid communication with the second portion of the container;

wherein during a sufficient rain event, the wastewater flows from the sewer system into the upper end of the container first portion, through the container first and second portions and the screen arrangement, and then into the effluent discharge passage, such that the wastewater flows generally in a first direction through the first portion of the container, then generally in a second direction different than the first direction through the second portion of the container, and wherein the treating agent dispenser operates to introduce the treating agent into the wastewater such that the treating agent has sufficient contact time with the wastewater to at least partially disinfect the wastewater during the rain event.

2. The system of claim 1 wherein the screen arrangement is oriented generally transverse to the second direction.

3. The system of claim 1 further comprising a relief gate disposed above the screen arrangement and between the first and second portions, the relief gate being operable to allow wastewater to bypass the screen arrangement and flow to the effluent passage.

4. The system of claim 1 wherein the container includes a third portion having an upper end and a lower end, and a divider disposed between the third portion and the first portion, the third portion being adapted to receive the excess wastewater from the sewer system prior to the first portion, and wherein the divider is configured to allow wastewater to flow from the third portion, over the divider and to the first portion when capacity of the third portion is exceeded.

5. The system of claim 1 wherein the container comprises a shaft structure, and the first and second portions are formed as first and second passages of the shaft structure.

6. The system of claim 5 wherein the shaft structure is oriented generally vertically.

7. The system of claim 5 wherein the first and second passages are disposed adjacent to each other and are separated by a divider.

8. The system of claim 5 wherein the shaft structure has a diameter of at least 10 feet.

9. The system of claim 5 wherein the shaft structure is configured to accommodate a flow rate of at least 2,000 gallons per minute.

10. The system of claim 1 wherein the first and second portions are spaced apart from each other, and wherein the container further includes a connector passage that extends between the first and second portions.

11. The system of claim 10 wherein first and second portions comprise first and second shaft structures, respectively, and wherein the connector passage defines a volume, and each shaft structure defines a shaft volume that is greater than the volume of the connector passage.

12. The system of claim 10 wherein flow time through the first and second portions is at least double the flow time through the connector passage.

13. The system of claim 1 wherein the multiple screens include first and second screens, and wherein the raised portion is disposed between the first and second screens.

14. The system of claim 1 wherein the screen arrangement includes a cleaning system for automatically removing material from the screens during the rain event, such that the material may be trapped by the recess, wherein the debris comprises the material.

15. The system of claim 14 wherein the cleaning system includes a cleaning member having a portion positioned above a first one of the screens, wherein the cleaning member further has another portion that extends downwardly through the first screen.

16. The system of claim 14 wherein the cleaning system includes a cleaning member positioned beneath one of the screens.

17. A wastewater treatment system for treating excess wastewater from a sewer system, the wastewater treatment system comprising:

a treating agent dispenser for introducing a treating agent into the wastewater;

a container adapted to receive excess wastewater from the sewer system, the container having first and second portions that each have an upper end and a lower end, the lower ends being interconnected;

a generally horizontally oriented screen arrangement disposed in the second portion of the container, the screen arrangement including a screen having a lower surface, a cleaning system for removing material from the screen, and a support member having a raised portion adjacent the screen, wherein the raised portion defines a downwardly facing recess, and the recess extends above the lower surface of the screen; and an effluent discharge passage in fluid communication with the second portion of the container;

wherein during a sufficient rain event, the wastewater flows from the sewer system into the upper end of the container first portion, through the container first and second portions and the screen arrangement, and then into the effluent discharge passage, such that the wastewater flows generally in a first direction through the first portion of the container, then generally in a second direction different than the first direction through the second portion of the container, wherein the treating agent dispenser operates to introduce the treating agent into the wastewater such that the treating agent has sufficient contact time with the wastewater to at least partially disinfect the wastewater during the rain event, and wherein the recess of the screen arrangement is configured to trap, at least temporarily, the material removed by the cleaning system during the rain event.

18. The system of claim 17 wherein the screen arrangement includes an additional screen disposed adjacent the raised portion such that the raised portion is disposed between the screens.

* * * * *